(12) United States Patent
Ando

(10) Patent No.: US 8,643,944 B2
(45) Date of Patent: Feb. 4, 2014

(54) INFRARED ZOOMING LENS

(75) Inventor: Minoru Ando, Saitama (JP)

(73) Assignee: Tamron Co., Ltd, Saitama (JP)

( * ) Notice: Subject to any disclaimer, the term of this patent is extended or adjusted under 35 U.S.C. 154(b) by 252 days.

(21) Appl. No.: 13/039,626

(22) Filed: Mar. 3, 2011

(65) Prior Publication Data

US 2011/0216398 A1 Sep. 8, 2011

(30) Foreign Application Priority Data

Mar. 5, 2010 (JP) ................................. 2010-049447

(51) Int. Cl.
| | | |
|---|---|---|
| *G02B 13/14* | (2006.01) | |
| *G02B 15/14* | (2006.01) | |
| *G02B 9/34* | (2006.01) | |
| *G02B 13/00* | (2006.01) | |

(52) U.S. Cl.
CPC *G02B 13/14* (2013.01); *G02B 9/34* (2013.01); *G02B 15/14* (2013.01); *G02B 13/008* (2013.01)
USPC ............ 359/357; 359/356; 359/676; 359/687

(58) Field of Classification Search
USPC .......................... 359/354–357, 686–687, 642
See application file for complete search history.

(56) References Cited

U.S. PATENT DOCUMENTS

| | | | | |
|---|---|---|---|---|
| 3,947,084 | A | * | 3/1976 | Noyes ............................. 359/354 |
| 4,030,805 | A | * | 6/1977 | Rogers ........................... 359/357 |
| 4,397,520 | A | | 8/1983 | Neil |
| 4,411,488 | A | | 10/1983 | Neil |
| 4,679,891 | A | | 7/1987 | Roberts |
| 4,738,496 | A | | 4/1988 | Canzek |
| 4,802,717 | A | | 2/1989 | Kebo |
| 4,871,219 | A | | 10/1989 | Cooper |
| 4,907,867 | A | | 3/1990 | Perrin et al. |
| 4,989,962 | A | | 2/1991 | Kebo |
| 4,999,005 | A | | 3/1991 | Cooper |
| 5,202,792 | A | | 4/1993 | Rollin |

(Continued)

FOREIGN PATENT DOCUMENTS

| | | |
|---|---|---|
| CN | 101395517 A | 3/2009 |
| CN | 101609203 A | 12/2009 |

(Continued)

OTHER PUBLICATIONS

Chen, Lv-ji, et al.; A Four-piece Dual Field of View Optical System for LWIR Thermal Imager; Infrared Technology; Jan. 2010; vol. 32, No. 1.

(Continued)

*Primary Examiner* — Thong Nguyen
(74) *Attorney, Agent, or Firm* — Westerman, Hattori, Daniels & Adrian, LLP

(57) ABSTRACT

The present invention is directed to an infrared zoom lens that consists merely of optical components of germanium so as to implement an optical system that is capable of reducing variation in brightness during varying a magnification rate and is quite bright and that facilitates compensating for aberration, especially spherical aberration that is generally hard to do, thereby producing a clear and vivid image. The infrared zoom lens comprises first to fourth groups of lens pieces arranged in series from the foremost position closest to the object; each of the lens groups having all the lens pieces made of germanium, and at least one of the lens groups consisting simply of a single lens piece.

13 Claims, 24 Drawing Sheets

(56) References Cited

U.S. PATENT DOCUMENTS

| | | | |
|---|---|---|---|
| 5,808,799 A | 9/1998 | Klocek | |
| 5,838,489 A | 11/1998 | Erdmann | |
| 5,909,308 A | 6/1999 | Ulrich | |
| 6,091,551 A | 7/2000 | Watanabe | |
| 6,104,547 A * | 8/2000 | Nanba | 359/687 |
| 6,249,374 B1 | 6/2001 | Chipper | |
| 7,035,022 B2 | 4/2006 | Kato | |
| 7,348,203 B2 * | 3/2008 | Kaushal et al. | 438/64 |
| 7,564,617 B2 * | 7/2009 | Reichert | 359/356 |
| 7,859,747 B2 | 12/2010 | Hiraiwa et al. | |
| 2003/0210468 A1 | 11/2003 | Kato | |
| 2004/0036982 A1 | 2/2004 | Chipper | |
| 2005/0134971 A1 | 6/2005 | Yamashita | |
| 2008/0180789 A1 | 7/2008 | Reichert | |
| 2011/0216397 A1 * | 9/2011 | Kawaguchi et al. | 359/357 |

FOREIGN PATENT DOCUMENTS

| | | |
|---|---|---|
| JP | 63-52113 A | 3/1988 |
| JP | 64-77016 A | 3/1989 |
| JP | 3044612 A | 2/1991 |
| JP | 6-27368 A | 2/1994 |
| JP | 10-213746 A | 8/1998 |
| JP | 3365606 B2 | 8/1998 |
| JP | 2001-108895 A | 4/2001 |
| JP | 2002-511151 A | 4/2002 |
| JP | 3326641 B2 | 9/2002 |
| JP | 2002-372667 A | 12/2002 |
| JP | 2003-322711 A | 11/2003 |
| JP | 2003-329936 A | 11/2003 |
| JP | 2004-264685 A | 9/2004 |
| JP | 2005-62559 A | 3/2005 |
| JP | 2005-181499 A | 7/2005 |
| JP | 2005-521918 A | 7/2005 |
| JP | 2007-264649 A | 10/2007 |
| JP | 2008-249838 A | 10/2008 |
| JP | 2009192886 A | 8/2009 |
| WO | 87/06717 A1 | 11/1987 |

OTHER PUBLICATIONS

Office Action dated Apr. 23, 2013, issued in related U.S. Appl. No. 13/039,569.

U.S. Office Action dated Dec. 5, 2013, issued in corresponding U.S. Appl. No. 13/039,569.

* cited by examiner (WIDE-ANGLE)

(TELEPHOTO)

FIG. 7
(WIDE-ANGLE)
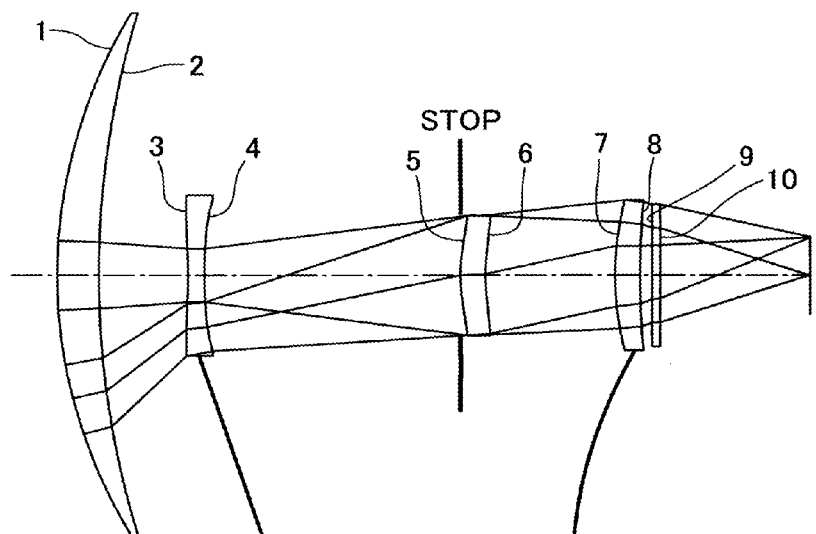
(TELEPHOTO)
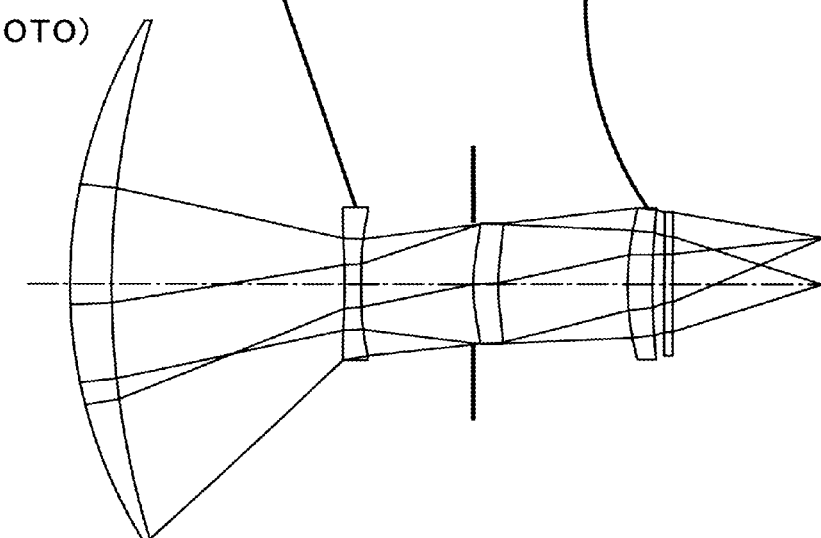

(WIDE-ANGLE)

(TELEPHOTO)

(WIDE-ANGLE)

(TELEPHOTO)

FIG. 19
(WIDE-ANGLE)
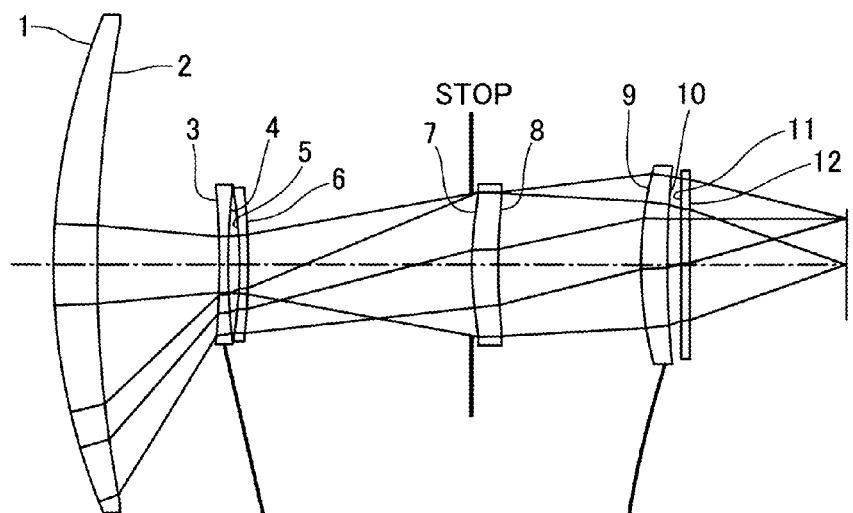
(TELEPHOTO)
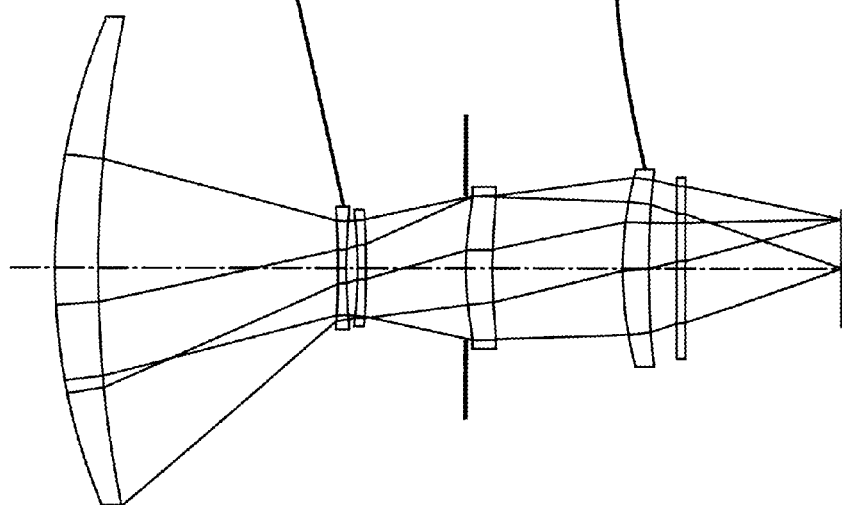

INFRARED ZOOMING LENS

FIELD OF THE INVENTION

The present invention relates to an infrared zoom lens of improved ability to compensate for spherical aberration and reduced manufacturing cost.

BACKGROUND ART

Prior art infrared zoom lenses include a thermally insulated infrared zoom lens that has optical elements arranged in series from the foremost position closest to the object toward the focal point along the optical axis, namely, first to third lens elements in this sequence where the first lens element has its first and second major surfaces opposed to each other to exhibit positive magnification power, the second lens element has its first and second major surfaces opposed to each other to exhibit negative magnification power, and the third lens element has its first and second major surfaces opposed to each other to exhibit positive magnification power. The first and third lens elements are made of a first substance while the second lens element alone is made of a second substance different from the first substance, and a variation in refractive index of the first substance due to a variation in its temperature (dn/dT) is smaller than that of the second substance, and either one or both of the second major surfaces of the first and third lens elements is formed in diffractive surface (see Patent Document 1 listed below).

Another prior art infrared zoom lens has first to third groups of lens pieces arranged in series from the foremost position closest to the object, and during the zooming, the first and third lens groups are essentially fixed while the second lens group alone are movable where each of the first to third lens groups has at least one lens piece made of zinc sulfide (see Patent Document 2).

Still anther prior art infrared zoom lens is that which incorporates optics dedicated to infrared rays raging 3 to 5 μm or 8 to 12 μm in waveband and which has five groups of lens pieces arranged in series from the foremost position closest to the object, namely, a first lens group consisting of one or two lens pieces to exhibit positive power, a second lens group consisting of one or two lens pieces to exhibit negative power, a third lens group of a single negative meniscus lens having its concave surface positioned closer to the object, a fourth lens group of a single convex lens piece, and a fifth lens group consisting of at least four lens pieces where the rearmost lens piece closest to the imaging field is a positive meniscus lens having its convex major surface faced toward the object; and during the zooming, the first, fourth and fifth lens groups are essentially fixed while the second and third lens groups are movable so that displacing the second lens group along the optical axis permits magnification rate to alter, and meanwhile, displacing the third lens group along the optical axis enables to correct the imaging point under the requirements as defined in the following formulae:

$1.00 < f_1/f_t$ $f_2/f_t < -0.40$ $0.35 < f_5/f_t < 0.70$ where $f_t$ is a focal length of the entire optics at the telephoto end, $f_1$ is the focal length of the first lens group, $f_2$ is the focal length of the first lens group, and $f_5$ is the focal length of the fifth lens group (see Patent Document 3).

LIST OF THE CITED DOCUMENTS ON THE PRIOR ART

Patent Document 1: [0006] Japanese Preliminary Publication of Unexamined Patent Application No. 2005-521918[0007] Patent Document 2: [0008] Japanese Preliminary Publication of Unexamined Patent Application No. 2007-264649[0009] Patent Document 3: Japanese Patent No. 3365606

Configured as in Patent Document 1, the infrared zoom lens having its first and third lens elements made of the first substance facilitates maintenance by virtue of simple and manageable storage of the lens substance but is prone to lead to a critical problem that such a zoom lens is troublesome in compensating for aberration. The infrared zoom lens configured as in Patent Document 1 also has a static focal mechanism, which means it conducts no dynamic focusing control and cannot be user friendly.

Configured as in Patent Document 2, the infrared zoom lens has all the lens pieces made of zinc sulfide, which is disadvantageous in that the substance of the lens pieces is expensive and intractable in processing such as molding, polishing, and so forth. In one embodiment of this type of the infrared zoom lens, zinc sulfide is used in combination with germanium. The substance of zinc sulfide which is of low refractive index (approximately 2.2) is disadvantageous in that it brings about difficulty in compensating for aberration.

Configured as in Patent Document 3, the infrared zoom lens incorporates nine to twelve of the lens pieces, which is disadvantageous in that such a zoom lens costs more to fabricate, and that the lens pieces absorb infrared rays more to resultantly produce a darker picture. In addition, because of the larger number of the lens pieces, a lens barrel of such a zoom lens should be more complicated in structure.

The present invention is made to overcome the aforementioned problems in the prior art infrared zoom lenses, and accordingly, it is an object of the present invention to provide the improved infrared zoom lens that consists merely of optical components of germanium so as to implement an optical system that is capable of reducing variation in brightness during varying a magnification rate and is quite bright.

It is another object of the present invention to provide the improved infrared zoom lens that has the reduced number of lens pieces to implement a simple-structure and lightweight lens barrel and that has the lens pieces of the reduced absorbance of infrared rays so as to produce a bright image.

It is further another object of the present invention to provide the improved infrared zoom lens that is capable of compensating for Aberration adequately throughout the zooming range.

SUMMARY OF THE INVENTION

In one aspect of the present invention, an infrared zoom lens has first to fourth groups of lens pieces arranged in series from the foremost position closest to the object; each of the lens groups having all the lens pieces made of germanium, and at least one of the lens groups consisting simply of a single lens piece.

In accordance with the present invention, the infrared zoom lens has an optical system that can reduce variation in brightness during varying a magnification rate and is quite bright and that facilitates compensating for aberration, thereby producing a clear and vivid image.

Also, in accordance with the present invention, the infrared zoom lens has the reduced number of lens pieces so as to bring about a simple-structure and lightweight lens barrel, and it has the lens pieces of the reduced absorbance of infrared rays so as to produce a bright image.

Moreover, in accordance with the present invention, the infrared zoom lens is useful to compensate for aberration adequately throughout the zooming range.

The present invention is exemplified in the following manners:

The infrared zoom lens has the first lens group of positive power, the second lens group of negative power, the third lens group of positive power, and the fourth lens group of positive power.

Configured in this manner, the infrared zoom lens advantageously reduces variation in aberration throughout the zooming range.

In another aspect of the present invention, the infrared zoom lens may be adapted to meet requirements as defined in the following formula:

$$0.8 \leq f1/ft \leq 1.7 \quad (1)$$

where ft is a focal length of the zoom lens at a telephoto setting, and f1 is the focal length of the first lens group.

The formula (1) provide the requirements to fulfill both the demands of avoiding the entire length of the optics and compensating for aberration. If exceeding the lower limit as defined in the formula (1), the infrared zoom lens has its first lens group intensified in power, which results in spherical aberration being increased at a telephoto setting. On the contrary, if exceeding the upper limit as defined in the formula (1), the infrared zoom lens has its first lens group diminished in power, which leads to a problem that the entire length of the optics should unavoidably increase.

Alternatively, the infrared zoom lens may be adapted to meet requirements as defined in the following formula:

$$-0.7 \leq f2/ft \leq -0.1 \quad (2)$$

where ft is a focal length of the zoom lens at a telephoto setting, and f2 is the focal length of the second lens group.

The formula (2) provide the requirements to fulfill the demand of inhibiting both variation in aberration during varying a magnification rate and increase in field curvature. If exceeding the upper limit as defined in the formula (2), the infrared zoom lens has its second lens group diminished in power to be insufficient to correct the field curvature. If exceeding the lower limit as defined in the formula (2), the infrared zoom lens has its second lens group intensified in power, which brings about the increased variation in aberration during varying a magnification rate.

Alternatively, the infrared zoom lens may be adapted to meet requirements as defined in the following formula:

$$1.8 \leq f3/fw \leq 4 \quad (3)$$

where fw is a focal length of the zoom lens at a wide-angle setting, and f3 is the focal length of the third lens group.

The formula (3) provide the requirements to fulfill the demand of adequately compensating for spherical aberration. If exceeding the upper limit as defined in the formula (3), the infrared zoom lens is able to only insufficiently compensate for spherical aberration, which in turn leads to a problem that the entire length of the optics should unavoidably increase. If exceeding the lower limit as defined in the formula (3), the infrared zoom lens excessively compensate for spherical aberration at a wide-angle setting.

In further another aspect of the present invention, the first and third lens groups stay still in their respective fixed positions while the second and fourth lens groups are movable so as to vary a magnification rate.

Configured in this manner, the infrared zoom lens advantageously reduces variation in aberration, especially, field curvature throughout the zooming range.

Further alternatively, the fourth lens group is moved for the focusing.

Configured in this manner, the infrared zoom lens can effectively reduce variation in aberration during the focusing.

Alternatively, the first lens group may consist of a meniscus lens that has its front major surface closer to the object shaped in convex.

Configured in this manner, the infrared zoom lens facilitates an appropriate compensation for spherical aberration and distortion aberration.

Alternatively, the foremost lens piece closest to the object in the second lens group may have its rear major surface facing to the imaging field shaped in concave.

Configured in this manner, the infrared zoom lens facilitates compensating for field curvature.

Alternatively, the first lens group may have its lens piece shaped to have an aspherical surface.

Configured in this manner, the infrared zoom lens facilitates compensating for distortion aberration at a wide-angle setting and for spherical aberration at a telephoto setting.

Alternatively, the second lens group may have one or more of its lens pieces shaped to have an aspherical surface.

Configured in this manner, the infrared zoom lens facilitates both inhibiting variation in aberration as a result of varying a magnification rate and compensating for field curvature.

Alternatively, the third lens group may have one or more of its lens pieces shaped to have an aspherical surface.

Configured in this manner, the infrared zoom lens can effectively compensate for spherical aberration at a wide-angle setting and implement a bright optical system.

Further alternatively, the fourth lens group may have one or more of its lens pieces shaped to have an aspherical surface.

Configured in this manner, the infrared zoom lens facilitates compensation for field curvature and astigmatism and effectively inhibits variation in aberration during the focusing.

BRIEF DESCRIPTION OF THE DRAWINGS

In each optical diagram illustrating the behavior of optical components of an exemplary infrared zoom lens at wide-angle and telephoto settings, respectively, the arrangement of groups of lens pieces at wide-angle or telephoto settings, the center axis through the optics, and light beams incoming and outgoing in and from each lens group at the maximum angles of view are emphasized.

FIG. 7 is an optical diagram illustrating the behavior of a third preferred embodiment of the infrared zoom lens at wide-angle and telephoto settings, respectively, according to the present invention;

FIG. 19 is an optical diagram illustrating the behavior of a seventh preferred embodiment of the infrared zoom lens at wide-angle and telephoto settings, respectively, according to the present invention;

BEST MODE OF THE INVENTION

Embodiment 1

Figure 1:
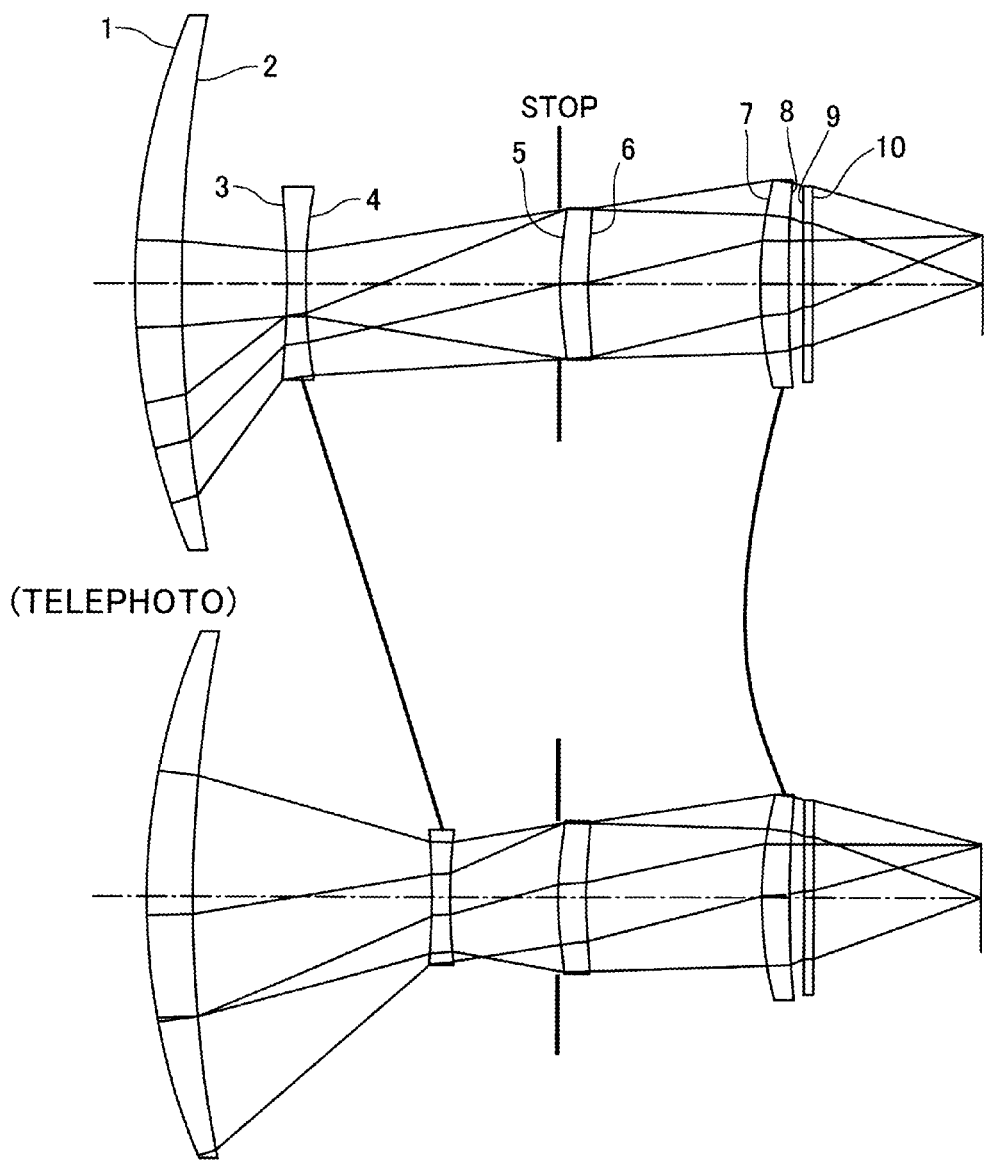
FIG. 1 is an optical diagram illustrating the behavior of a first preferred embodiment of an infrared zoom lens at wide-angle and telephoto settings, respectively, according to the present invention.
Figure 2:
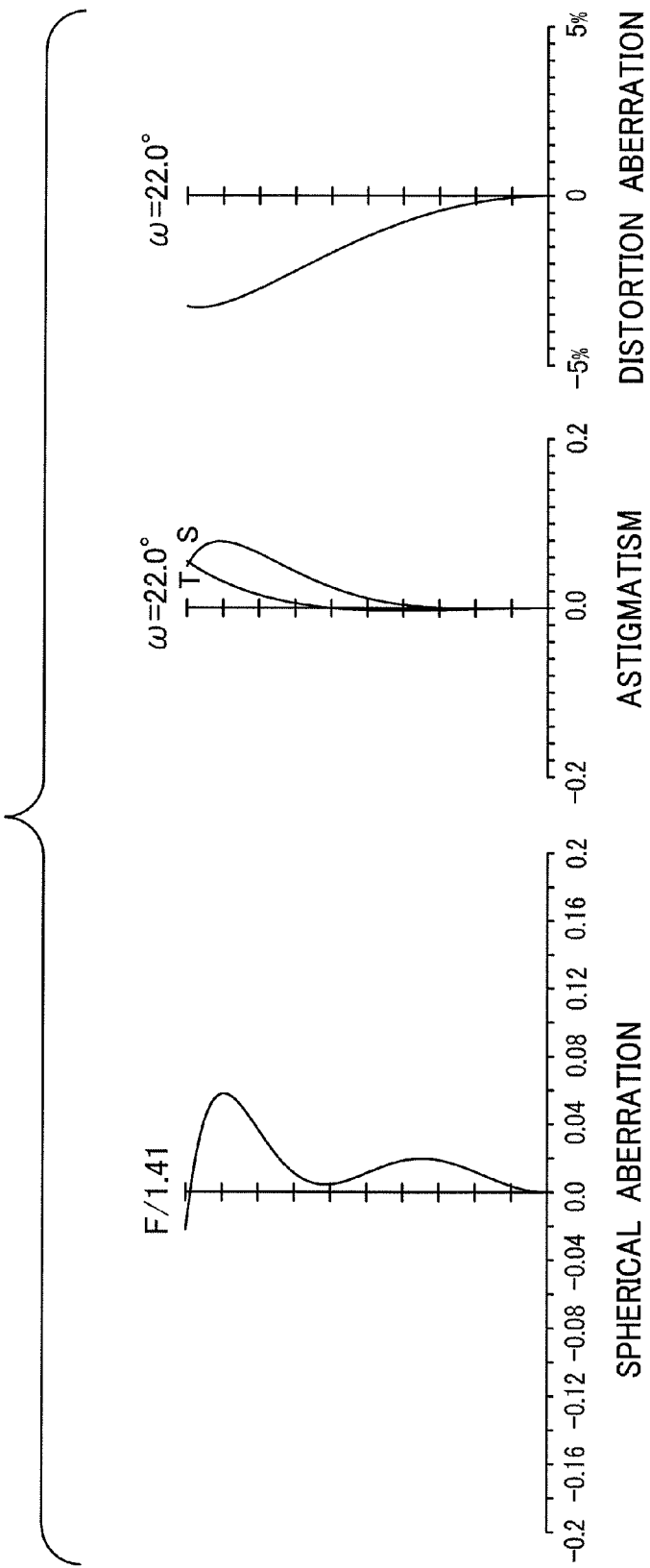
FIG. 2 depicts graphs on spherical aberration, astigmatism, and distortion aberration in the first preferred embodiment of the infrared zoom lens at a wide-angle setting.
Figure 3:
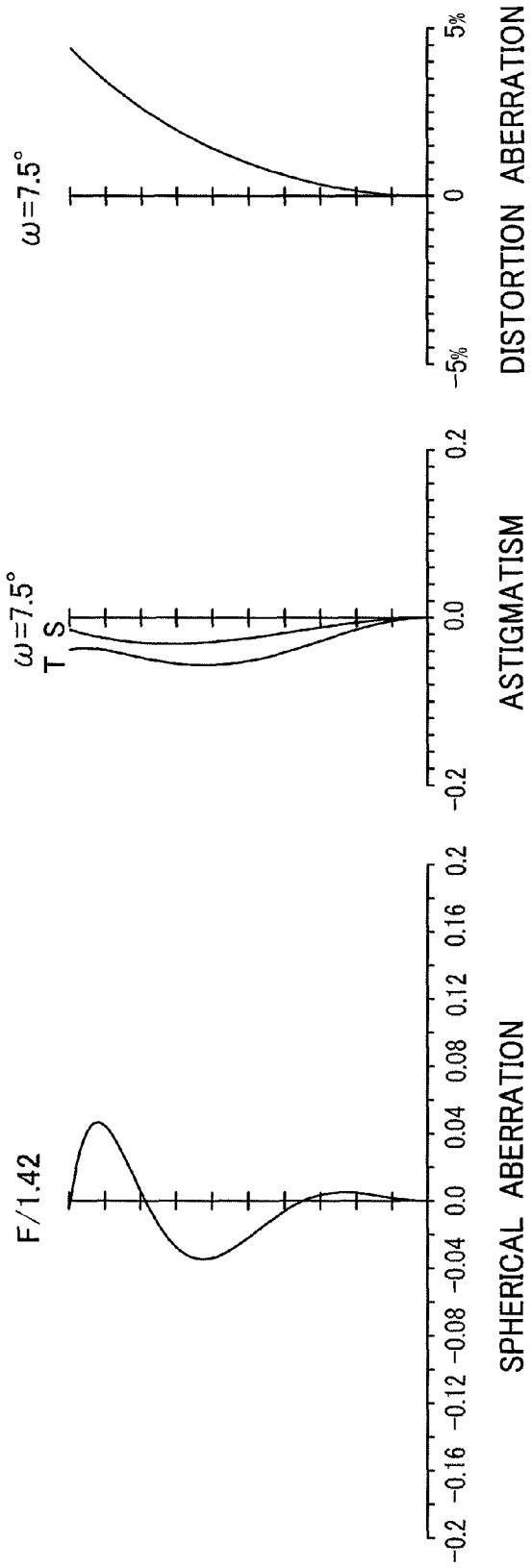
FIG. 3 depicts graphs on spherical aberration, astigmatism, and distortion aberration in the first preferred embodiment of the infrared zoom lens at a telephoto setting.
Figure 4:
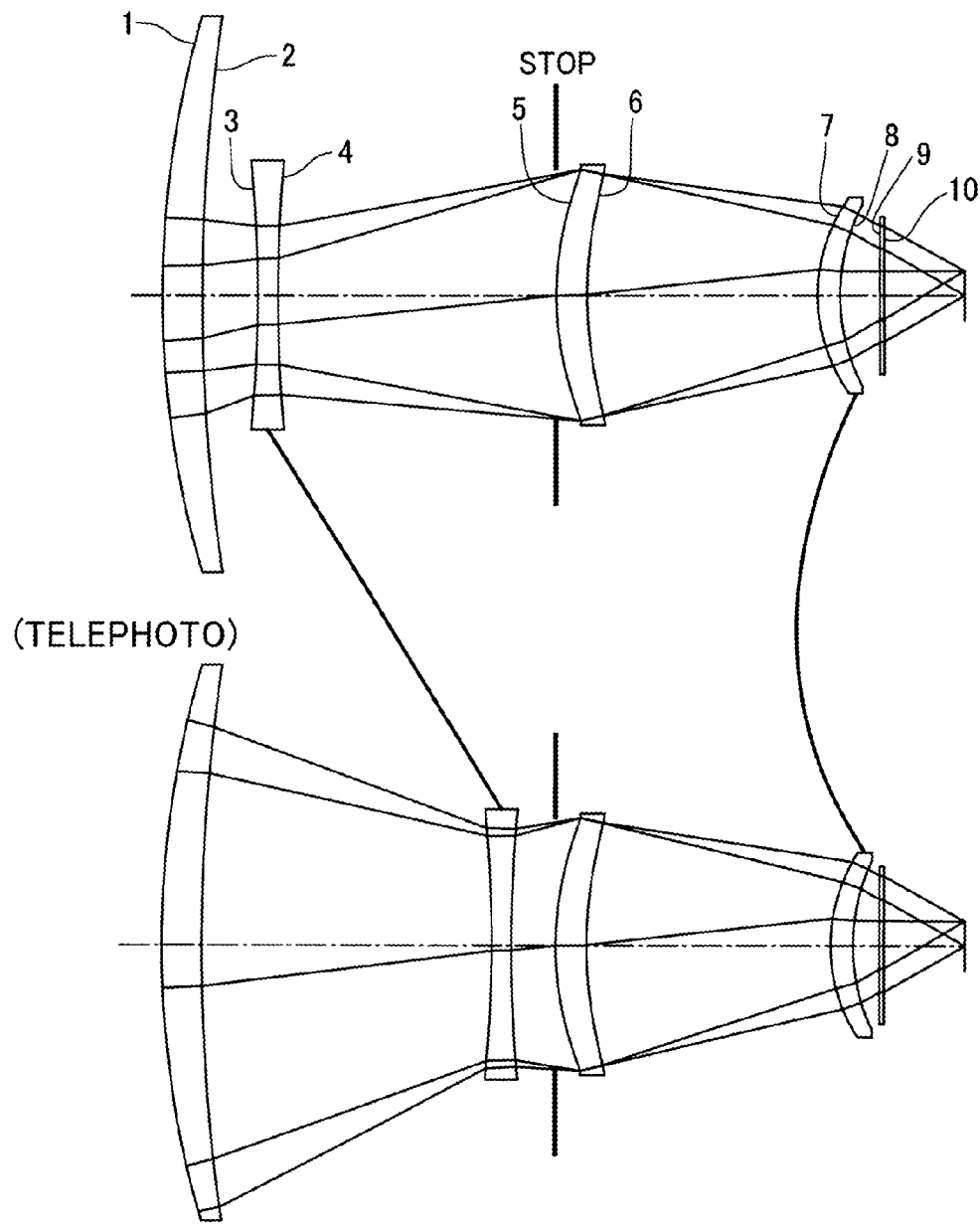
FIG. 4 is an optical diagram illustrating the behavior of a second preferred embodiment of the infrared zoom lens at wide-angle and telephoto settings, respectively, according to the present invention.
Figure 5:
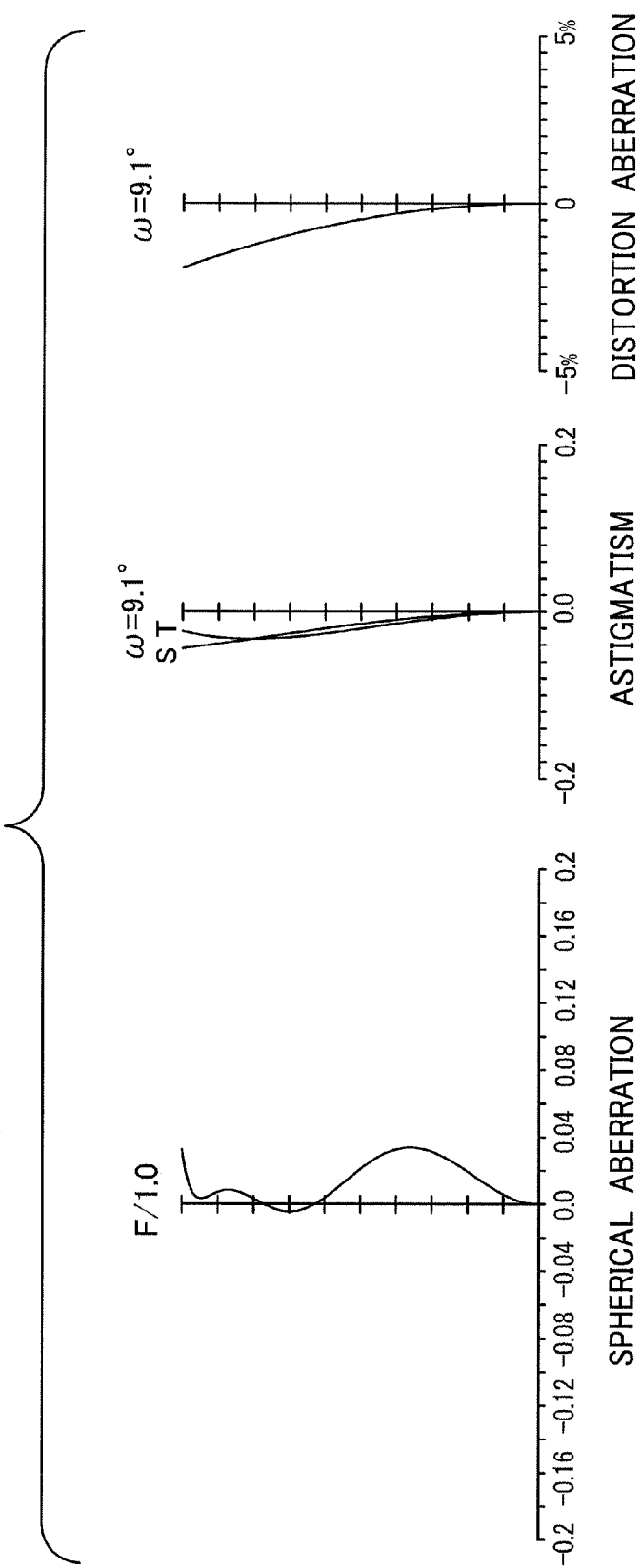
FIG. 5 depicts graphs on spherical aberration, astigmatism, and distortion aberration in the second preferred embodiment of the infrared zoom lens at a wide-angle setting.
Figure 6:
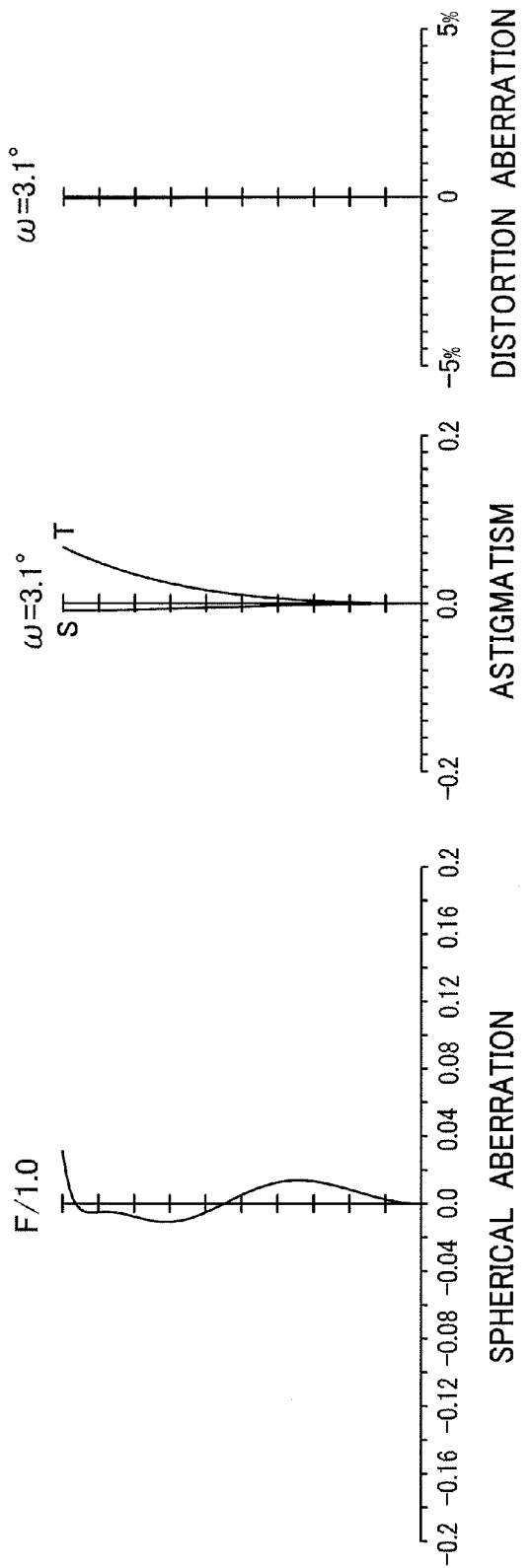
FIG. 6 depicts graphs on spherical aberration, astigmatism, and distortion aberration in the second preferred embodiment of the infrared zoom lens at a telephoto setting.
Figure 8:
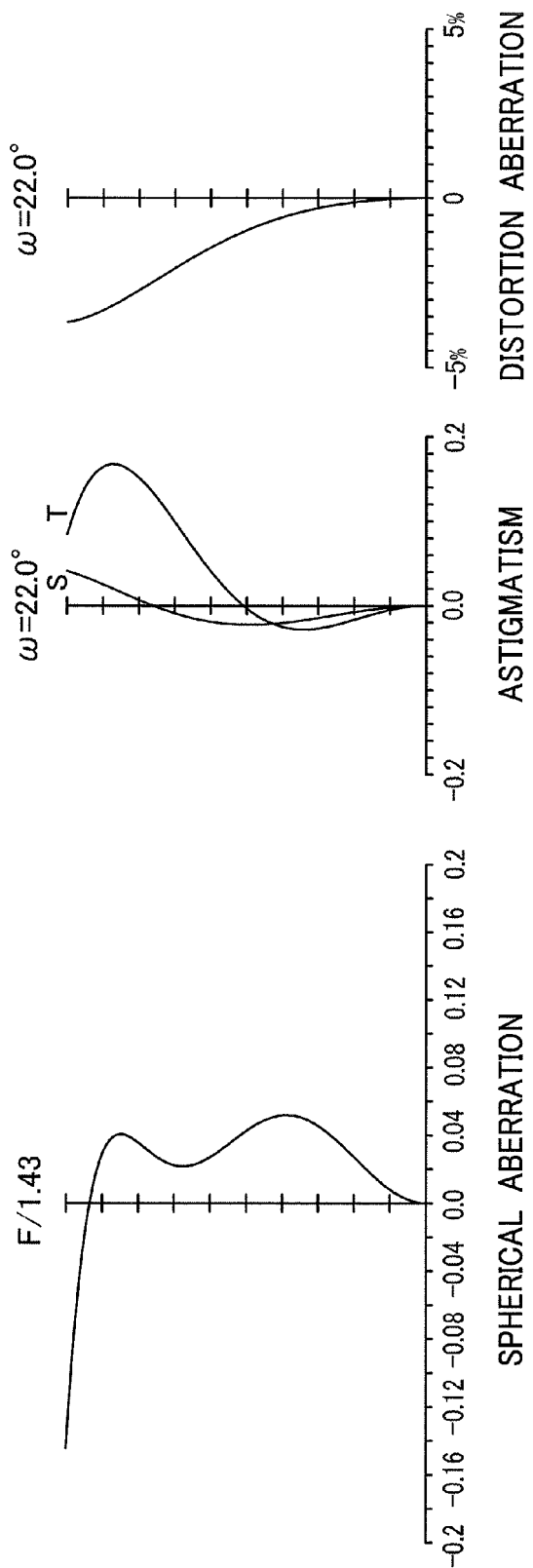
FIG. 8 depicts graphs on spherical aberration, astigmatism, and distortion aberration in the third preferred embodiment of the infrared zoom lens at a wide-angle setting.
Figure 9:
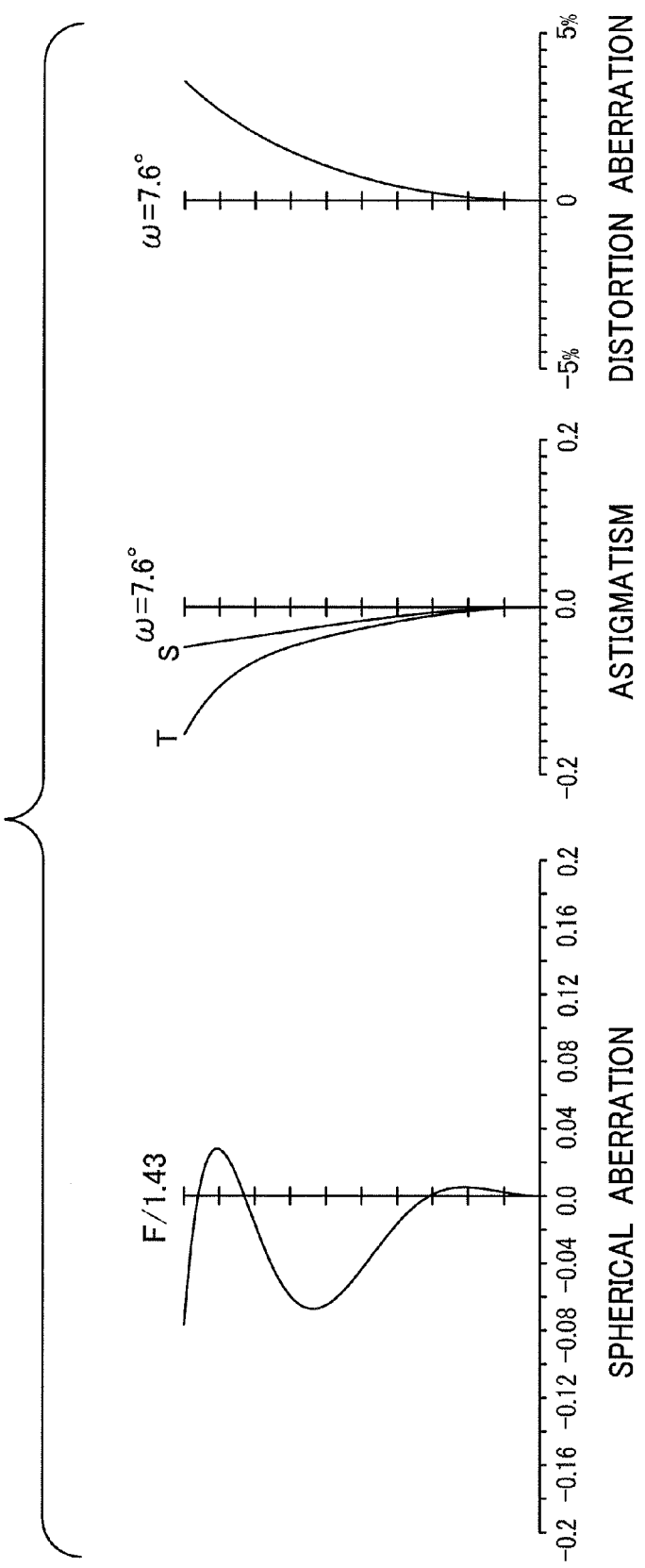
FIG. 9 depicts graphs on spherical aberration, astigmatism, and distortion aberration in the third preferred embodiment of the infrared zoom lens at a telephoto setting.
Figure 10:
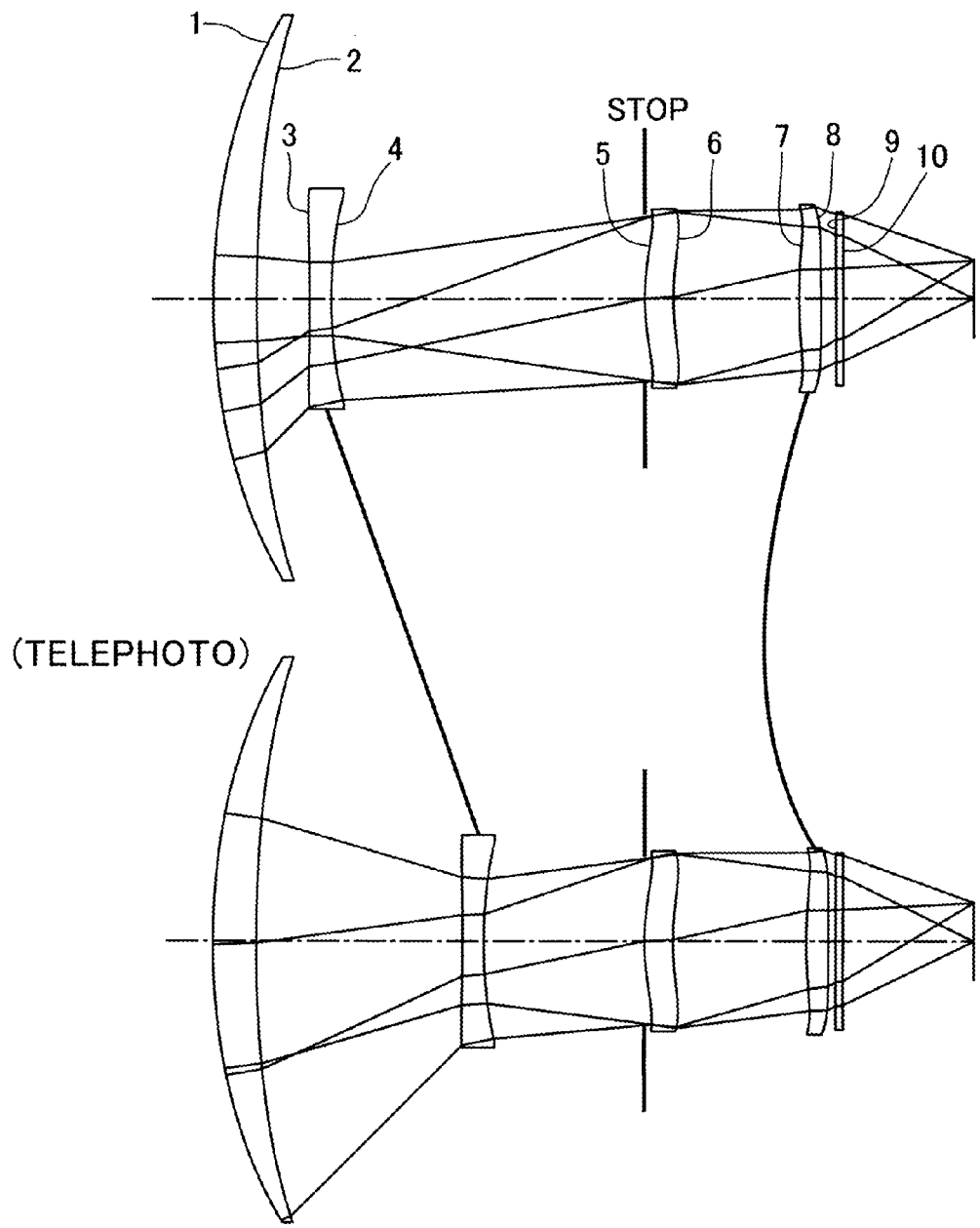
FIG. 10 is an optical diagram illustrating the behavior of a fourth preferred embodiment of the infrared zoom lens according to the present invention.
Figure 11:
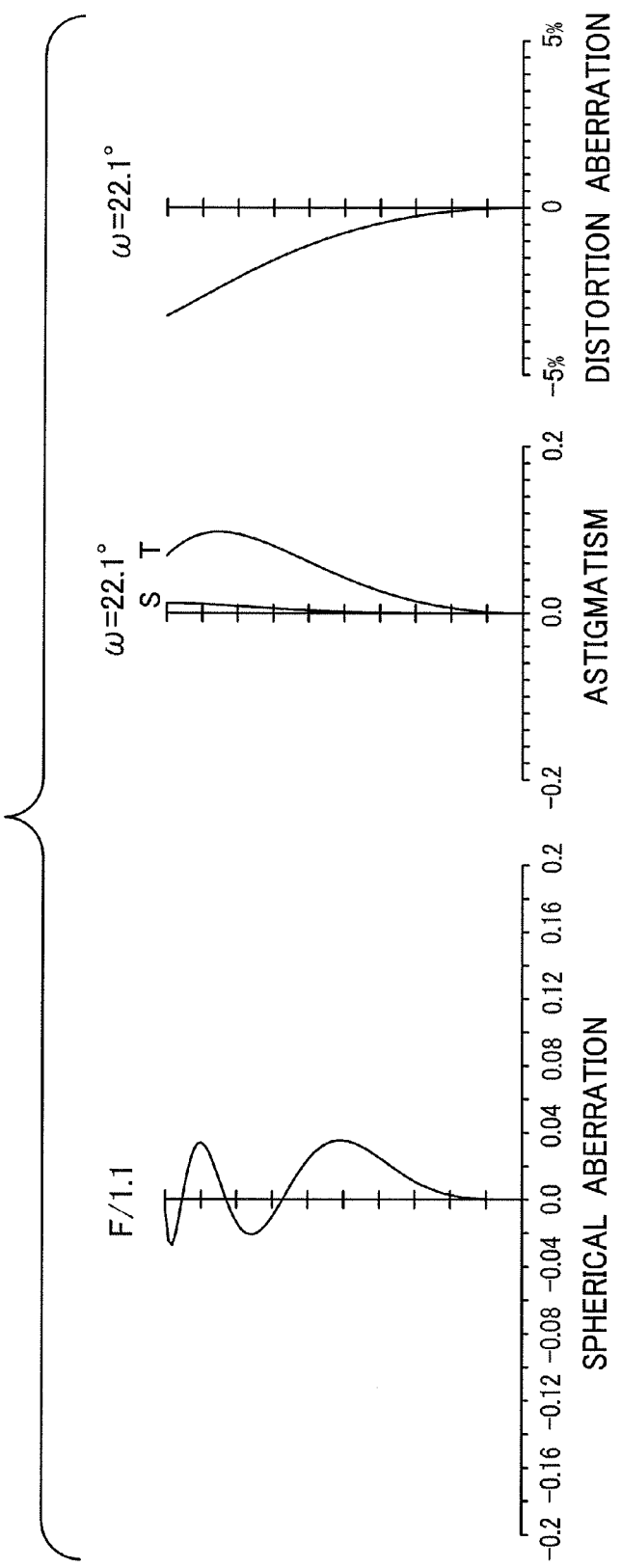
FIG. 11 depicts graphs on spherical aberration, astigmatism, distortion aberration in the fourth preferred embodiment of the infrared zoom lens at a wide-angle setting.
Figure 12:
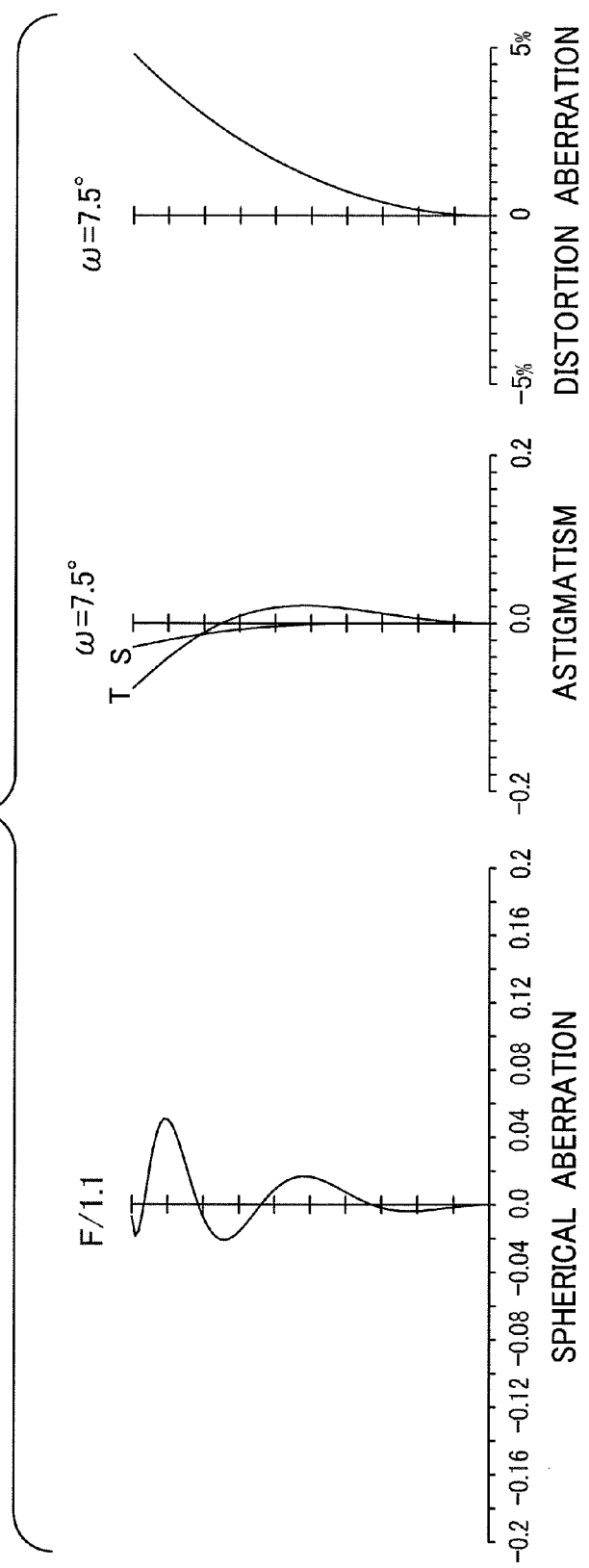
FIG. 12 depicts graphs on spherical aberration, astigmatism, distortion aberration in the fourth preferred embodiment of the infrared zoom lens at a telephoto setting.
Figure 13:
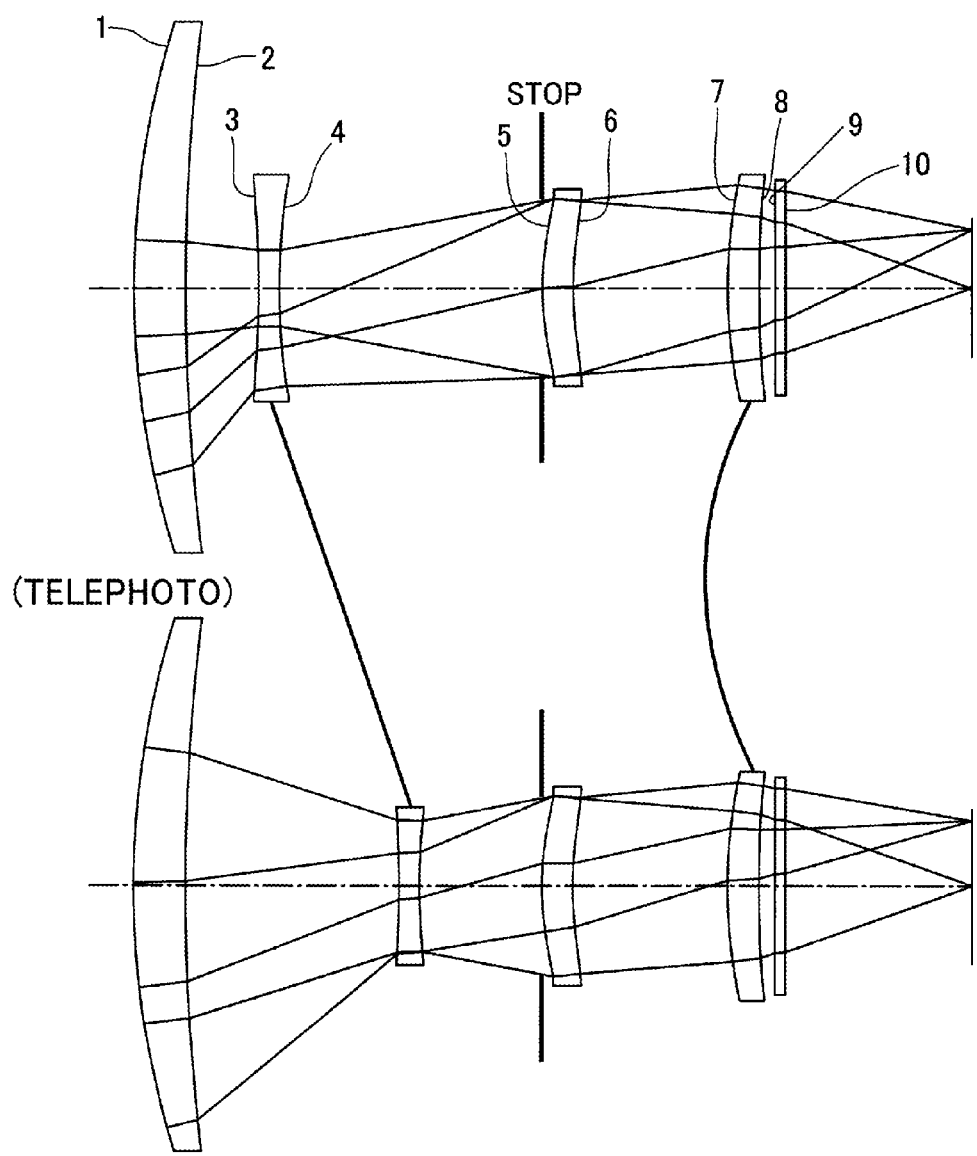
FIG. 13 is an optical diagram illustrating the behavior of a fifth preferred embodiment of the infrared zoom lens at wide-angle and telephoto settings, respectively, according to the present invention.
Figure 14:
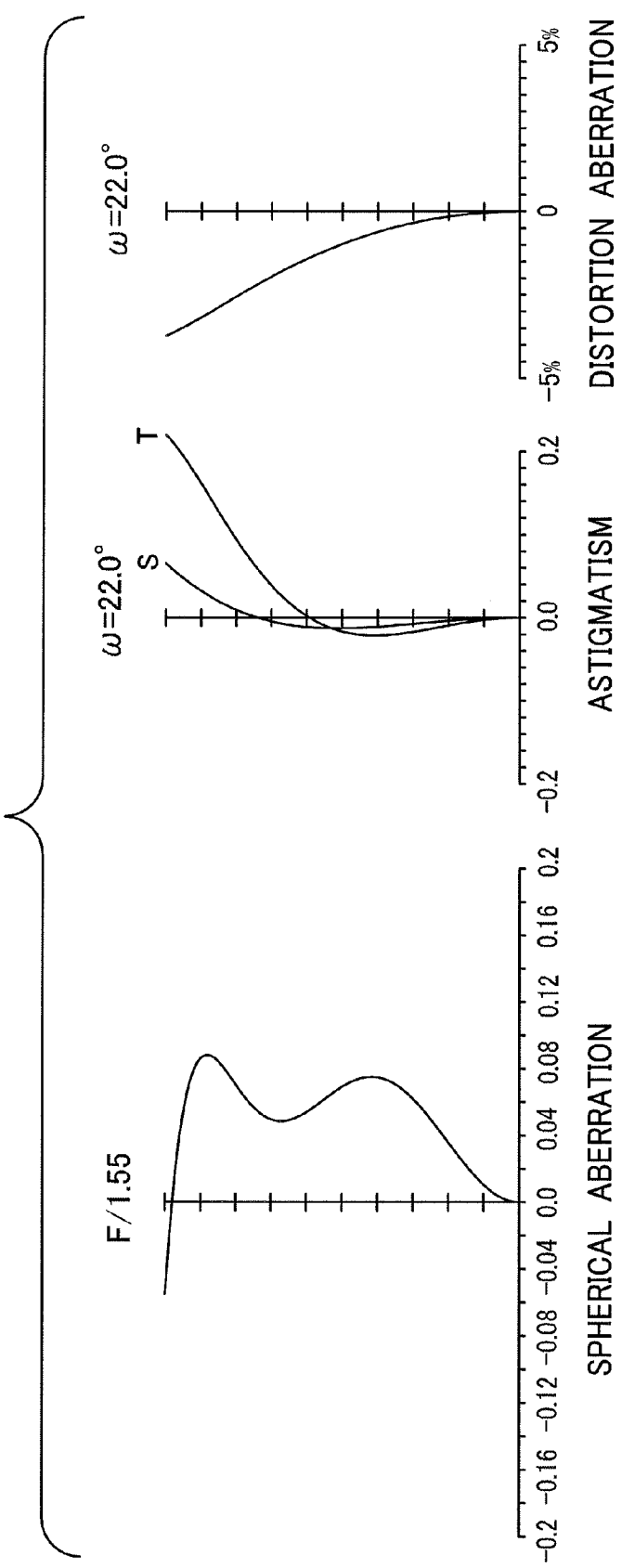
FIG. 14 depicts graphs on spherical aberration, astigmatism, and distortion aberration in the fifth preferred embodiment of the infrared zoom lens at a wide-angle setting.
Figure 15:
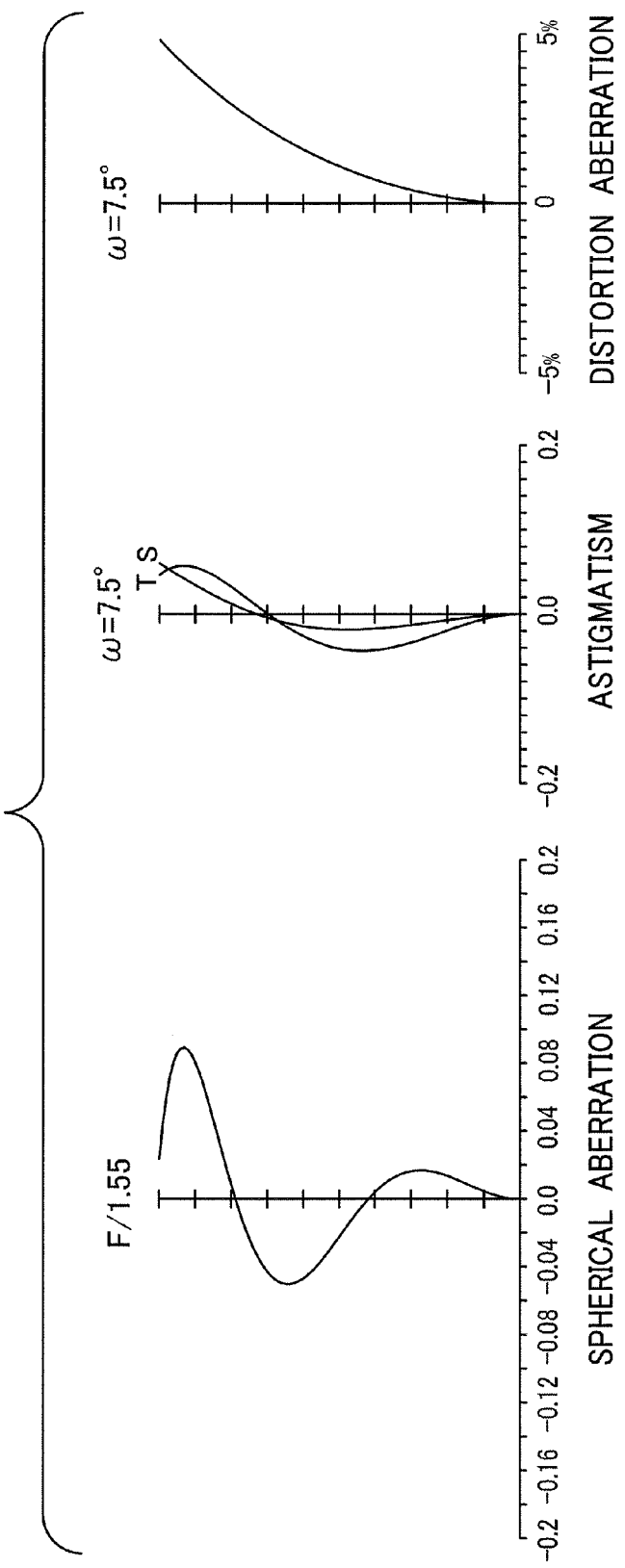
FIG. 15 depicts graphs on spherical aberration, astigmatism, and distortion aberration in the fifth preferred embodiment of the infrared zoom lens at a telephoto setting.
Figure 16:
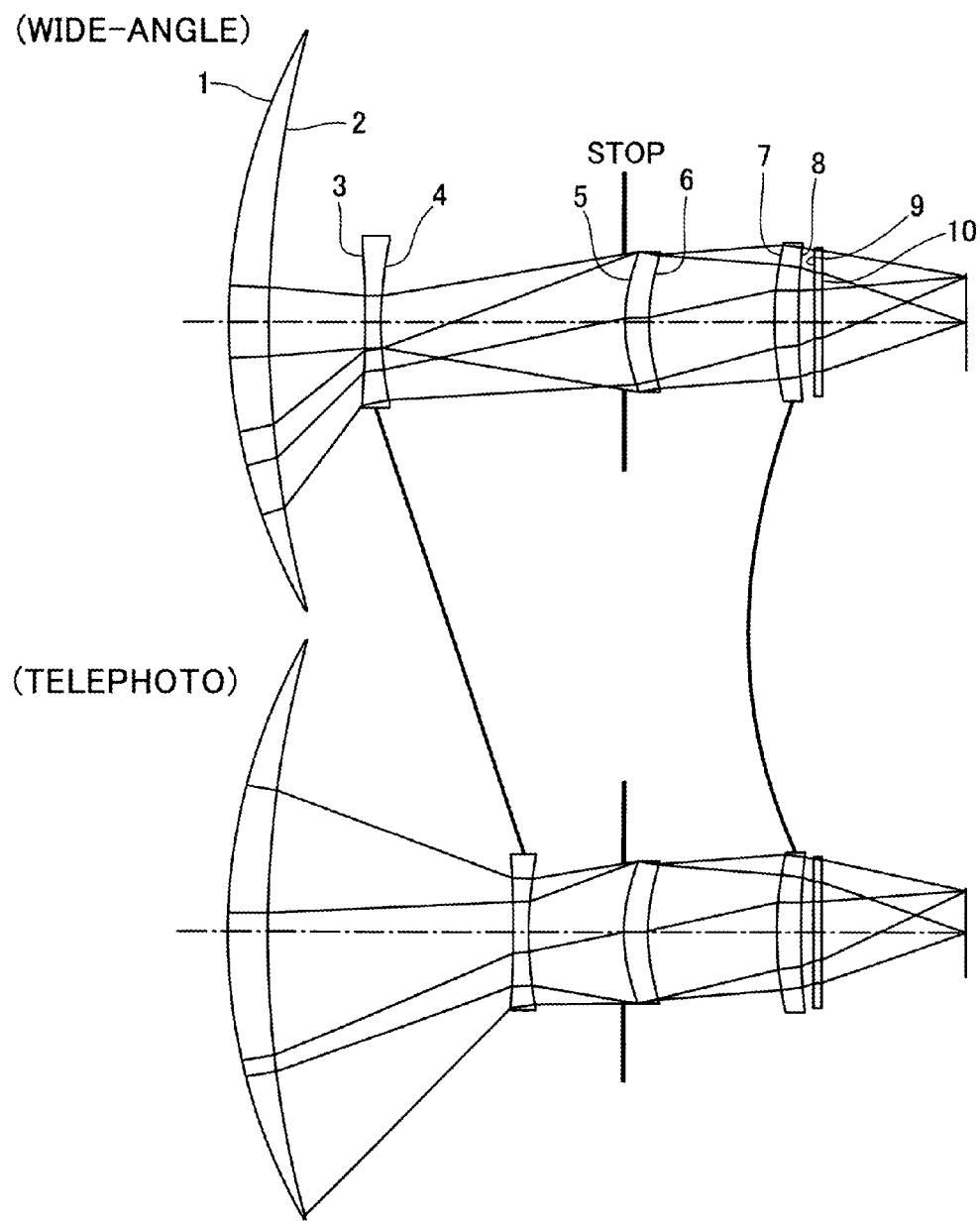
FIG. 16 is an optical diagram illustrating the behavior of a sixth preferred embodiment of the infrared zoom lens at wide-angle and telephoto settings, respectively, according to the present invention.
Figure 17:
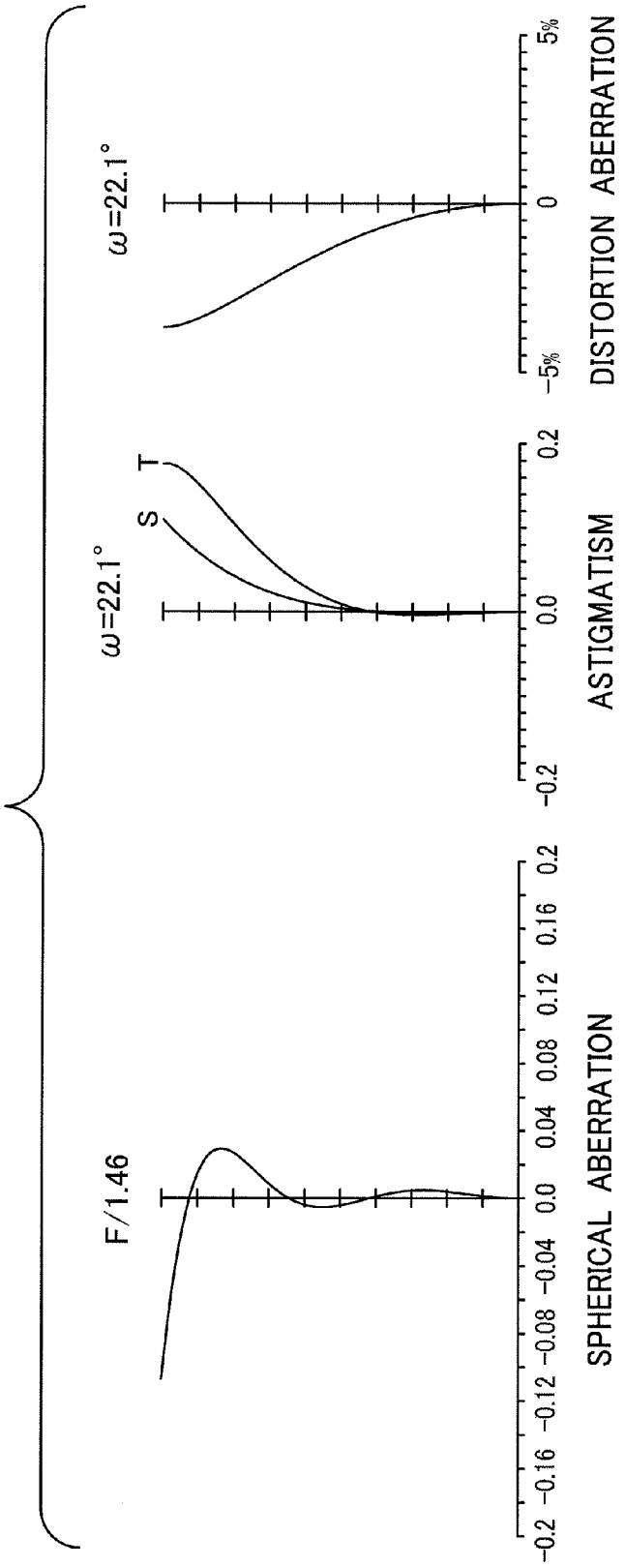
FIG. 17 depicts graphs on spherical aberration, astigmatism, and distortion aberration in the sixth preferred embodiment of the infrared zoom lens at a wide-angle setting.
Figure 18:
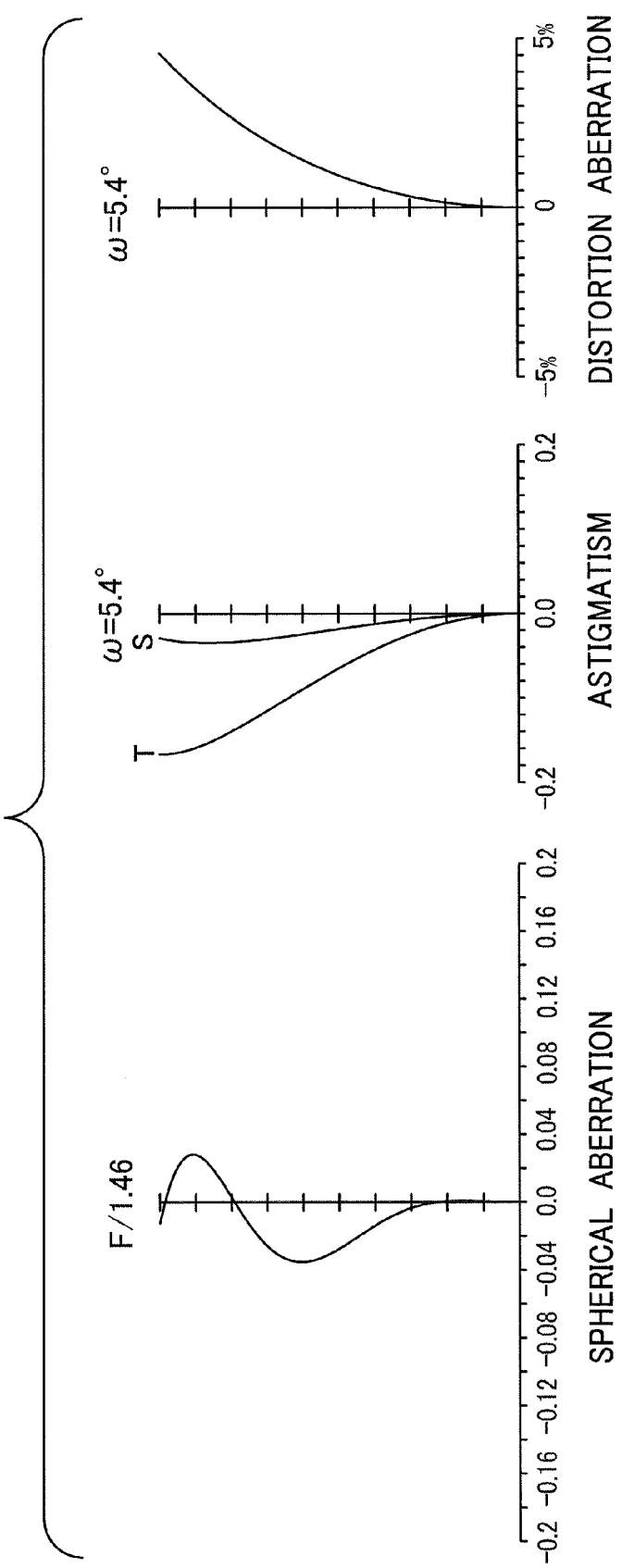
FIG. 18 depicts graphs on spherical aberration, astigmatism, and distortion aberration in the sixth preferred embodiment of the infrared zoom lens at a telephoto setting.
Figure 20:
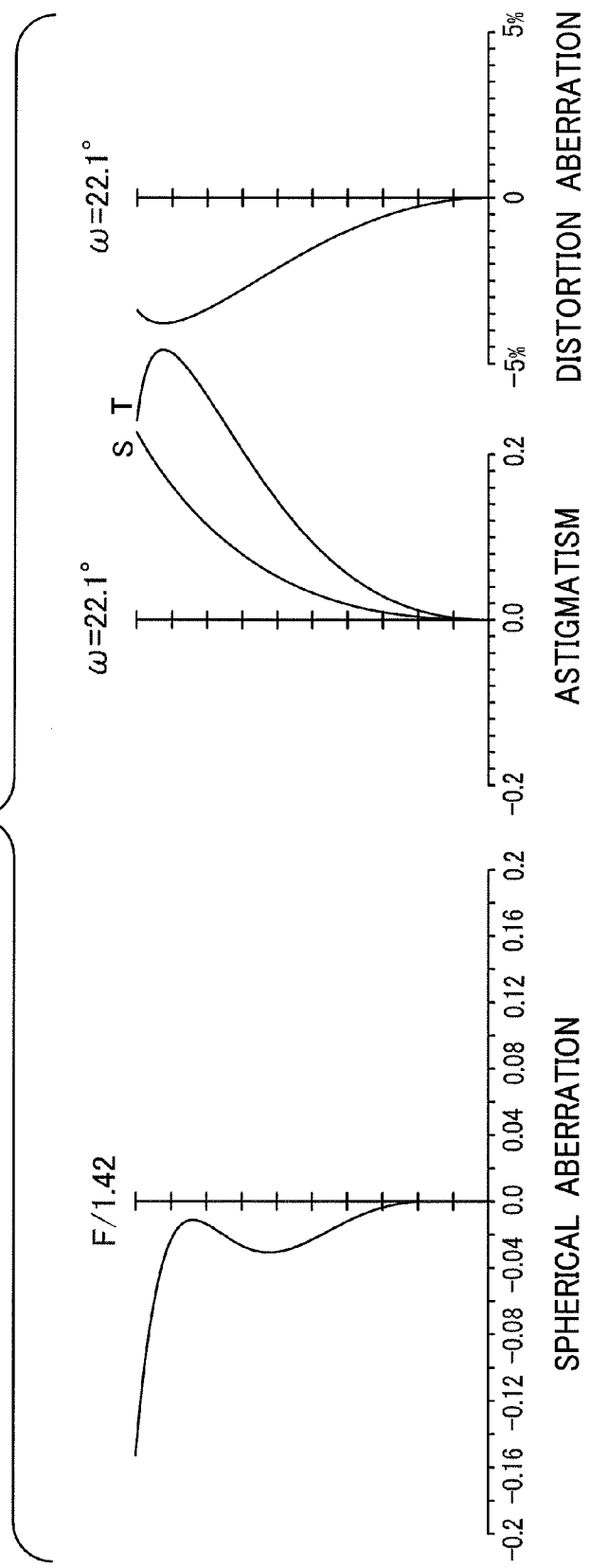
FIG. 20 depicts graphs on spherical aberration, astigmatism, and distortion aberration in the seventh preferred embodiment of the infrared zoom lens at a wide-angle setting.
Figure 21:
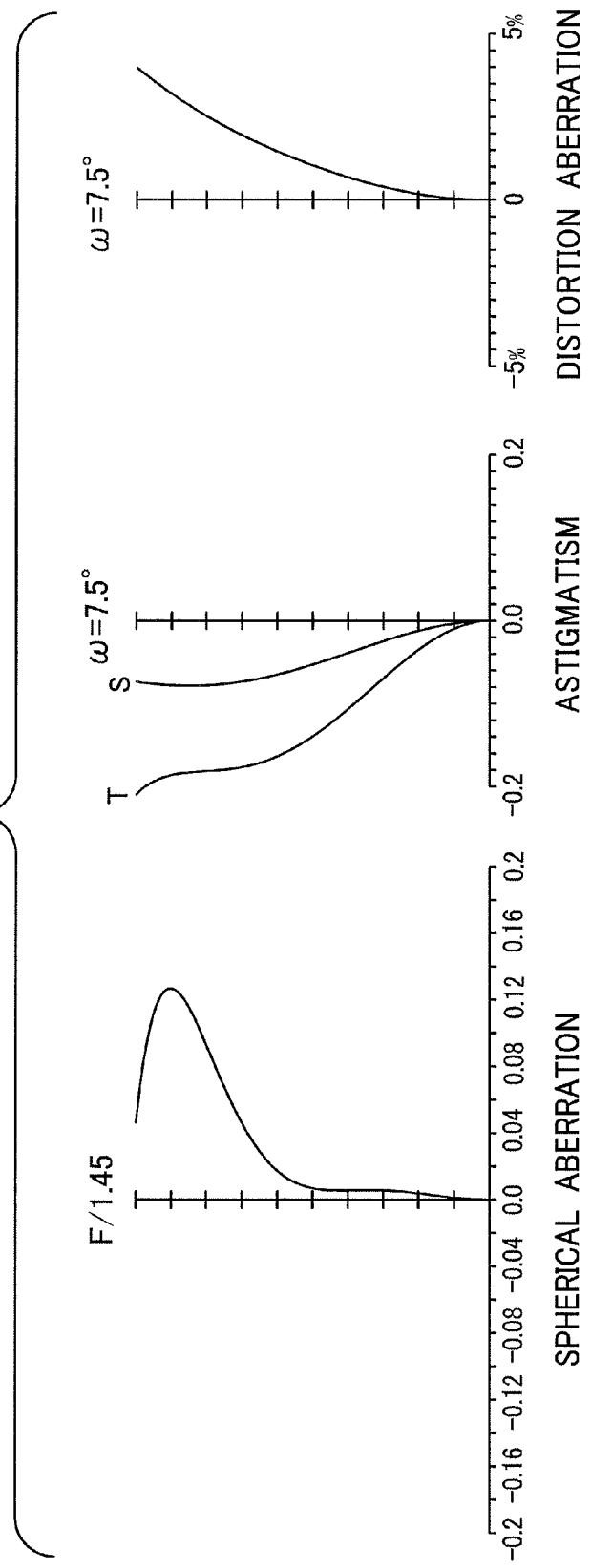
FIG. 21 depicts graphs on spherical aberration, astigmatism, and distortion aberration in the seventh preferred embodiment of the infrared zoom lens at a telephoto setting.
Figure 22:
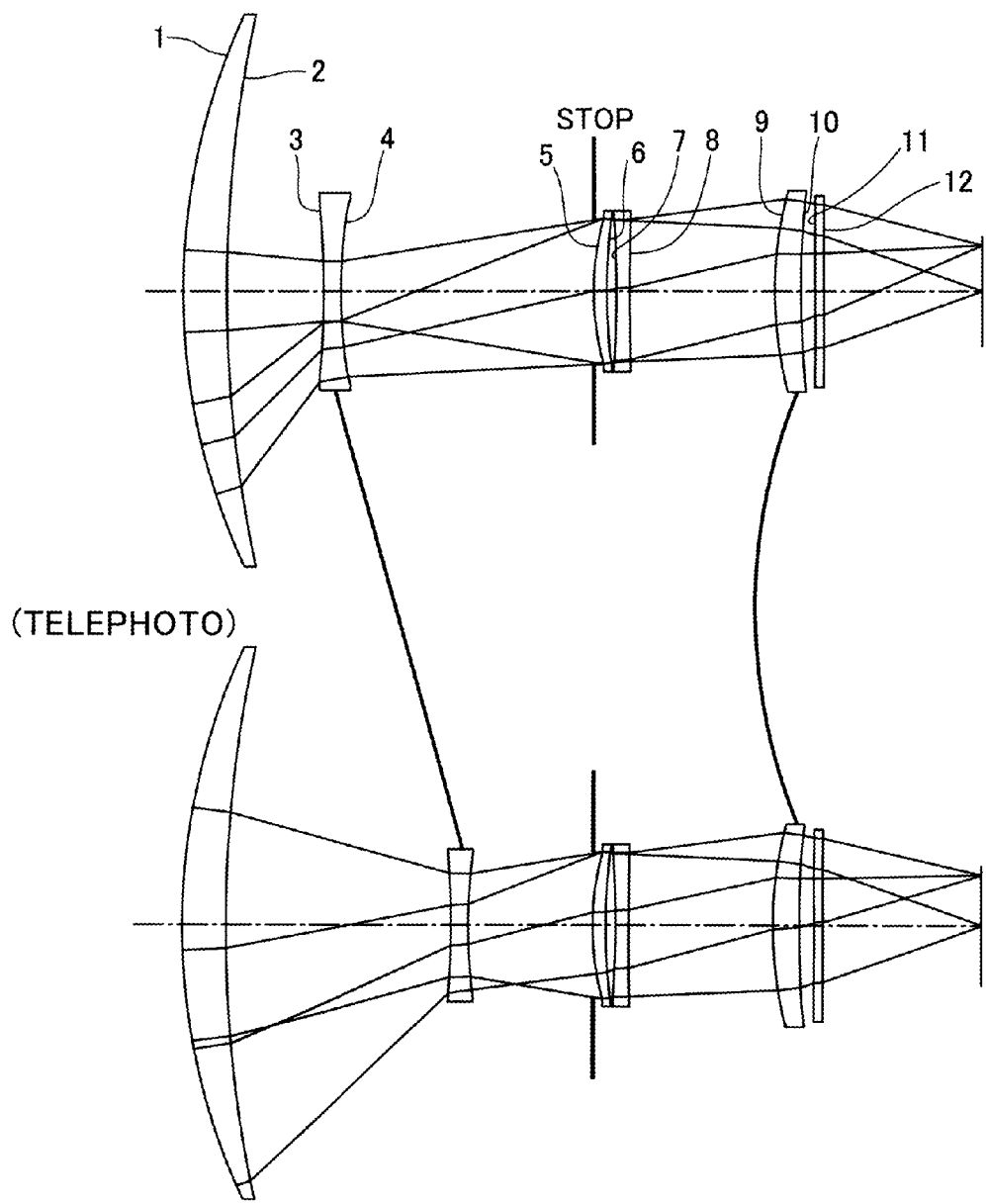
FIG. 22 is an optical diagram illustrating the behavior of an eighth preferred embodiment of the infrared zoom lens at wide-angle and telephoto settings, respectively, according to the present invention.
Figure 23:
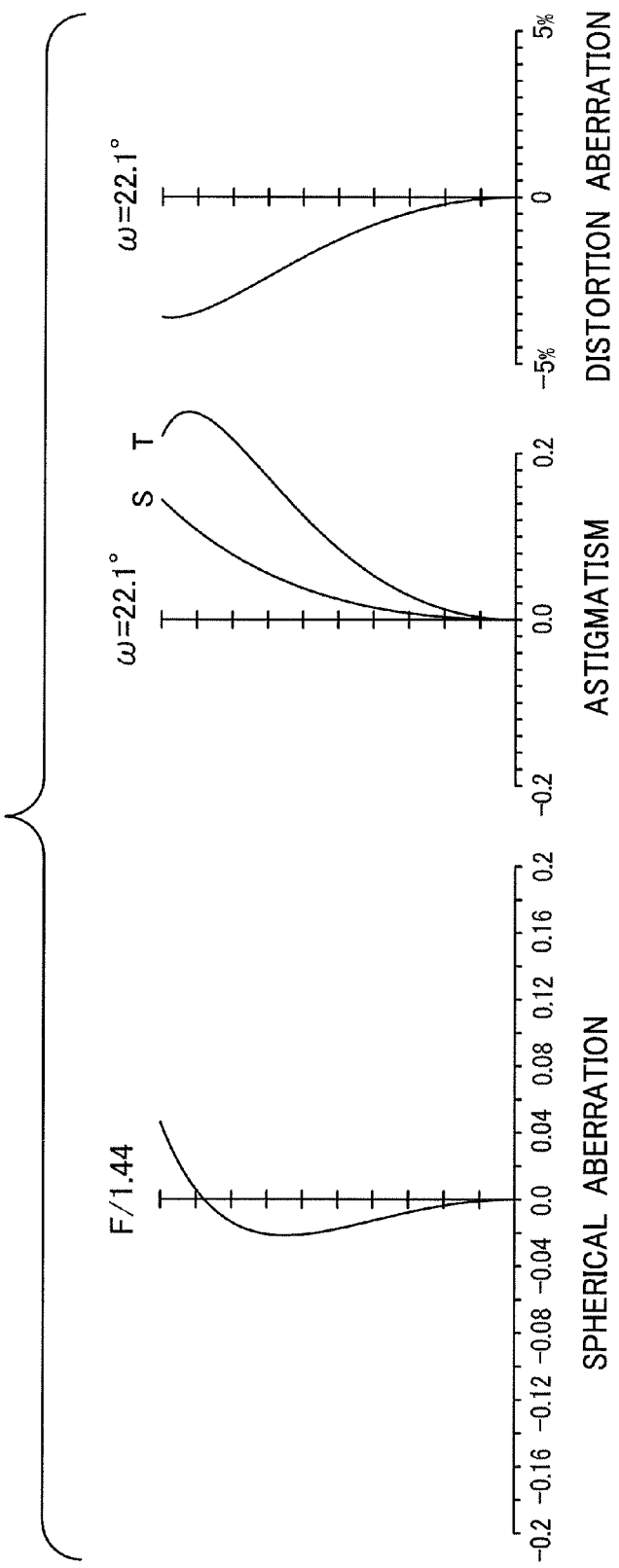
FIG. 23 depicts graphs on spherical aberration, astigmatism, and distortion aberration in the eighth preferred embodiment of the infrared zoom lens at a wide-angle setting.
Figure 24:
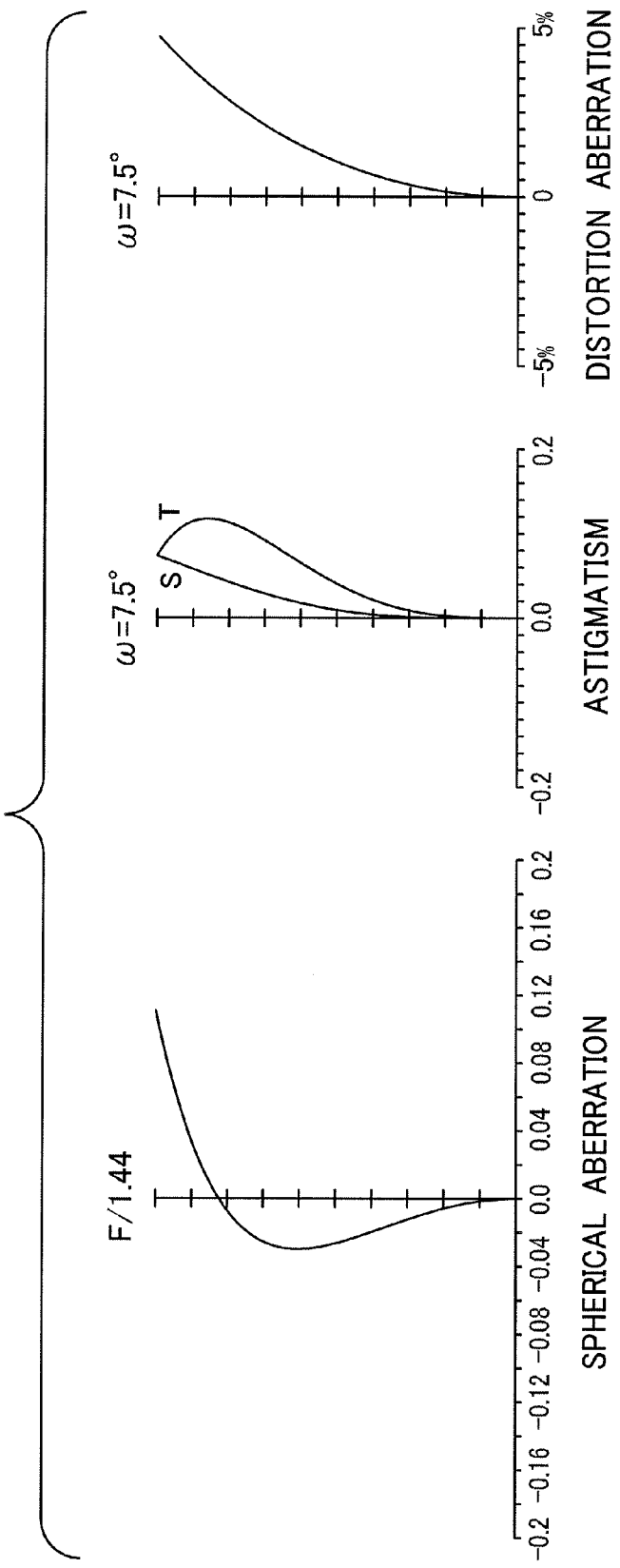
FIG. 24 depicts graphs on spherical aberration, astigmatism, and distortion aberration in the eighth preferred embodiment of the infrared zoom lens at a telephoto setting.

Data on a first preferred embodiment of an infrared zoom lens according to the present invention will be set forth below:

| SURFACE# | R | D | GLASS |
|---|---|---|---|
| 1 | 81.0000 | 5.0000 | GERMANIUM |
| 2 ASPH | 168.0078 | D(2) | |
| 3 ASPH | −101.6133 | 2.0000 | GERMANIUM |
| 4 ASPH | 67.9744 | D(4) | |
| 5 STOP | 37.8944 | 3.0000 | GERMANIUM |
| 6 ASPH | 51.6729 | D(6) | |
| 7 | 49.0000 | 3.0000 | GERMANIUM |
| 8 ASPH | 168.5145 | D(8) | |
| 9 | 0.0000 | 1.0000 | GERMANIUM |
| 10 | 0.0000 | D(10) | |

D(i) in the table above denotes where the distance between the adjacent lens groups varies as the focal length is varied (i is the number of the rearmost surface in one lens group).

Any of numbers identifying lens surfaces suffixed with characters ASPH designates an aspherical surface. A formula representing the aspherical surface is given as follows:

$$X = \frac{H^2/R}{1+\sqrt{1-(\varepsilon H^2/R^2)}} + AH^2 + BH^4 + CH^6 + DH^8 + EH^{10}$$

where H is a height of the aspherical surface from and perpendicular to the optical axis, X(H) is a varied amount of the height H relative to a varied departure with the apex of the aspherical surface at the origin, R is a paraxial radius of curvature, is a conic constant, A is the second order aspheric coefficient, B is the fourth order aspheric coefficient, C is the sixth order aspheric coefficient, D is the eighth order aspheric coefficient, and E is the tenth order aspheric coefficient.

| Data on the Aspherical Surface | | | | | | |
|---|---|---|---|---|---|---|
| SURFACE# | 0(EP) | 2(A) | 4(B) | 6(C) | 8(D) | 10(E) |
| 2 | −27.4716 | 0.00000E+000 | 7.71619E−007 | −1.83338E−010 | 0.00000E+000 | 0.00000E+000 |
| 3 | 47.8330 | 0.00000E+000 | 6.27110E−006 | 8.16225E−008 | 0.00000E+000 | 0.00000E+000 |
| 4 | 6.3703 | 0.00000E+000 | −6.48539E−006 | 8.36406E−008 | 0.00000E+000 | 0.00000E+000 |
| 5 | −16.5202 | 0.00000E+000 | 5.79215E−006 | −3.49341E−007 | 0.00000E+000 | 0.00000E+000 |
| 6 | −3.3024 | 0.00000E+000 | −3.40467E−005 | −2.12849E−007 | 0.00000E+000 | 0.00000E+000 |
| 8 | 101.0156 | 0.00000E+000 | 1.44689E−006 | −6.95217E−009 | 0.00000E+000 | 0.00000E+000 |

| Focal Length | |
|---|---|
| WIDE-ANGLE | TELEPHOTO |
| 14.03 | 40.00 |

Distance between the Adjacent Lens Groups during the Zooming

|        | WIDE-ANGLE | TELEPHOTO |
|--------|------------|-----------|
| D(2)   | 11.174     | 25.900    |
| D(4)   | 27.361     | 12.635    |
| D(6)   | 18.252     | 18.250    |
| D(8)   | 1.568      | 1.570     |
| D(10)  | 17.997     | 17.997    |

Distance between the Adjacent Lens Groups during the Zooming

|        | WIDE-ANGLE | TELEPHOTO |
|--------|------------|-----------|
| D(2)   | 12.500     | 65.536    |
| D(4)   | 63.036     | 10.000    |
| D(6)   | 51.580     | 54.574    |
| D(8)   | 8.8190     | 5.8248    |
| D(10)  | 18.000     | 18.000    |

Embodiment 2

Data on the optical components in a second preferred embodiment of the infrared zoom lens are set forth below:

| SURFACE# |         | R         | D      | GLASS     |
|----------|---------|-----------|--------|-----------|
| 1        |         | 217.4855  | 9.0000 | GERMANIUM |
| 2        | ASPH    | 418.5663  | D(2)   |           |
| 3        | ASPH    | −240.7084 | 4.5000 | GERMANIUM |
| 4        | ASPH    | 430.2428  | D(4)   |           |
| 5        | STOP    | 67.8117   | 7.0000 | GERMANIUM |
| 6        | ASPH    | 92.1746   | D(6)   |           |
| 7        |         | 37.8153   | 5.0000 | GERMANIUM |
| 8        | ASPH    | 44.8231   | D(8)   |           |
| 9        |         | 0.0000    | 1.0000 | GERMANIUM |
| 10       |         | 0.0000    | D(10)  |           |

Embodiment 3

Data of the optical components of a third preferred embodiment of the infrared zoom lens are set forth below:

| SURFACE# |        | R         | D      | GLASS     |
|----------|--------|-----------|--------|-----------|
| 1        |        | 81.0000   | 5.0000 | GERMANIUM |
| 2        |        | 146.8796  | D(2)   |           |
| 3        | ASPH   | −116.9334 | 2.0000 | GERMANIUM |
| 4        | ASPH   | 83.5380   | D(4)   |           |
| 5        | STOP   | 29.9322   | 3.0000 | GERMANIUM |
| 6        | ASPH   | 35.9505   | D(6)   |           |
| 7        |        | 49.0000   | 3.0000 | GERMANIUM |
| 8        | ASPH   | 157.5165  | D(8)   |           |
| 9        |        | 0.0000    | 1.0000 | GERMANIUM |
| 10       |        | 0.0000    | D(10)  |           |

Data on the Aspherical Surfaces

| SURFACE# | 0(EP)    | 2(A)         | 4(B)          | 6(C)          | 8(D)          | 10(E)        |
|----------|----------|--------------|---------------|---------------|---------------|--------------|
| 2        | 18.5449  | 0.00000E+000 | −3.13306E−008 | −2.42866E−012 | 0.00000E+000  | 0.00000E+000 |
| 3        | −99.0013 | 0.00000E+000 | 6.13608E−007  | −1.92476E−009 | 1.30313E−012  | 0.00000E+000 |
| 4        | 83.4977  | 0.00000E+000 | 1.26877E−006  | −2.48226E−009 | 1.49943E−012  | 0.00000E+000 |
| 5        | −1.1716  | 0.00000E+000 | 1.61863E−007  | 6.75443E−010  | −9.52129E−013 | 0.00000E+000 |
| 6        | 6.2011   | 0.00000E+000 | −1.52912E−006 | 6.19667E−010  | −1.65398E−012 | 0.00000E+000 |
| 8        | 1.2358   | 0.00000E+000 | 1.03673E−007  | 2.58085E−010  | 0.00000E+000  | 0.00000E+000 |

Focal Length

| WIDE-ANGLE | TELEPHOTO |
|------------|-----------|
| 35.01      | 100.00    |

Data on the Aspherical Surfaces

| SURFACE# | 0(EP)    | 2(A)         | 4(B)          | 6(C)          | 8(D)         | 10(E)        |
|----------|----------|--------------|---------------|---------------|--------------|--------------|
| 3        | 76.4793  | 0.00000E+000 | 2.32912E−005  | 7.25919E−008  | 0.00000E+000 | 0.00000E+000 |
| 4        | −99.0033 | 0.00000E+000 | 3.28211E−005  | 3.72487E−008  | 0.00000E+000 | 0.00000E+000 |
| 5        | −10.9064 | 0.00000E+000 | −4.11010E−007 | −8.83597E−006 | 0.00000E+000 | 0.00000E+000 |
| 6        | −0.4566  | 0.00000E+000 | −7.53352E−005 | −1.59835E−007 | 0.00000E+000 | 0.00000E+000 |
| 8        | 101.0658 | 0.00000E+000 | 3.21451E−006  | −8.01724E−009 | 0.00000E+000 | 0.00000E+000 |

Focal Length

| WIDE-ANGLE | TELEPHOTO |
|---|---|
| 14.08 | 39.99 |

Distance between the Adjacent Lens Groups during the Zooming

|  | WIDE-ANGLE | TELEPHOTO |
|---|---|---|
| D(2) | 10.706 | 28.286 |
| D(4) | 31.224 | 13.645 |
| D(6) | 15.628 | 15.623 |
| D(8) | 1.411 | 1.416 |
| D(10) | 17.996 | 17.996 |

Embodiment 4

Data on the optical components in a fourth preferred embodiment are set forth below:

| SURFACE# |  | R | D | GLASS |
|---|---|---|---|---|
| 1 | ASPH | 104.8085 | 6.0000 | GERMANIUM |
| 2 | ASPH | 226.6959 | D(2) |  |
| 3 | ASPH | −367.6765 | 3.0000 | GERMANIUM |
| 4 | ASPH | 76.9632 | D(4) |  |
| 5 | STOP | 34.4767 | 4.0000 | GERMANIUM |
| 6 | ASPH | 41.0586 | D(6) |  |
| 7 | ASPH | 75.9689 | 3.0000 | GERMANIUM |
| 8 | ASPH | 4791.8361 | D(8) |  |
| 9 |  | 0.0000 | 1.0000 | GERMANIUM |
| 10 |  | 0.0000 | D(10) |  |

Distance Between the Adjacent Lens Groups During the Zooming

|  | WIDE-ANGLE | TELEPHOTO |
|---|---|---|
| D(2) | 7.301 | 28.696 |
| D(4) | 43.869 | 22.483 |
| D(6) | 17.313 | 18.399 |
| D(8) | 2.085 | 0.999 |
| D(10) | 18.000 | 18.000 |

Embodiment 5

Data of the optical components in a fifth preferred embodiment are set forth below:

| SURFACE# |  | R | D | GLASS |
|---|---|---|---|---|
| 1 |  | 81.0000 | 5.0000 | GERMANIUM |
| 2 | ASPH | 206.6764 | D(2) |  |
| 3 | ASPH | −121.4551 | 2.0000 | GERMANIUM |
| 4 | ASPH | 55.3578 | D(4) |  |
| 5 | STOP | 25.9574 | 3.0000 | GERMANIUM |
| 6 | ASPH | 32.1012 | D(6) |  |
| 7 |  | 49.0000 | 3.0000 | GERMANIUM |
| 8 | ASPH | 130.7745 | D(8) |  |
| 9 |  | 0.0000 | 1.0000 | GERMANIUM |
| 10 |  | 0.0000 | D(10) |  |

Data on the Aspherical Surfaces

| SURFACE# | 0(EP) | 2(A) | 4(B) | 6(C) | 8(D) | 10(E) |
|---|---|---|---|---|---|---|
| 1 | 2.1838 | 0.00000E+000 | 2.75556E−007 | 9.87980E−012 | 0.00000E+000 | 0.00000E+000 |
| 2 | 2.4786 | 0.00000E+000 | 5.01545E−007 | −2.51984E−011 | 0.00000E+000 | 0.00000E+000 |
| 3 | −94.5812 | 0.00000E+000 | 1.37883E−006 | 1.84308E−008 | −2.83851E−011 | 0.00000E+000 |
| 4 | 8.1703 | 0.00000E+000 | −2.05051E−006 | 2.77221E−008 | −4.18470E−011 | 0.00000E+000 |
| 5 | −11.4441 | 0.00000E+000 | 7.56237E−006 | −2.62165E−007 | 5.85605E−010 | −4.08946E−0 |
| 6 | −13.6415 | 0.00000E+000 | −1.38618E−005 | −1.93711E−007 | −8.13217E−011 | 6.51028E−013 |
| 7 | −36.7911 | 0.00000E+000 | 8.23957E−006 | −1.68832E−007 | −1.63720E−010 | −1.18666E−013 |
| 8 | 100.2820 | 0.00000E+000 | 2.79145E−006 | −1.83138E−007 | 8.70962E−011 | 0.00000E+000 |

Focal Length

| WIDE-ANGLE | TELEPHOTO |
|---|---|
| 14.04 | 39.99 |

Data on the Aspherical Surfaces

| SURFACE# | 0(EP) | 2(A) | 4(B) | 6(C) | 8(D) | 10(E) |
|---|---|---|---|---|---|---|
| 2 | −99.0105 | 0.00000E+000 | 1.50195E−006 | −8.31787E−010 | 0.00000E+000 | 0.00000E+000 |
| 3 | 101.0613 | 0.00000E+000 | −1.39398E−005 | 2.43275E−007 | 0.00000E+000 | 0.00000E+000 |
| 4 | −23.7708 | 0.00000E+000 | −1.21623E−005 | 2.17607E−007 | 0.00000E+000 | 0.00000E+000 |
| 5 | −7.8898 | 0.00000E+000 | 2.41128E−005 | −4.47147E−007 | 0.00000E+000 | 0.00000E+000 |
| 6 | −1.7871 | 0.00000E+000 | −3.65234E−005 | −2.84591E−007 | 0.00000E+000 | 0.00000E+000 |
| 8 | 101.0822 | 0.00000E+000 | 2.87785E−006 | −1.85662E−008 | 0.00000E+000 | 0.00000E+000 |

Focal Length

| WIDE-ANGLE | TELEPHOTO |
|---|---|
| 14.03 | 55.98 |

Distance Between the Adjacent Lens Groups During the Zooming

| | WIDE-ANGLE | TELEPHOTO |
|---|---|---|
| D(2) | 7.031 | 20.720 |
| D(4) | 25.682 | 11.992 |
| D(6) | 14.922 | 14.925 |
| D(8) | 1.538 | 1.536 |
| D(10) | 17.992 | 17.992 |

Embodiment 6

Data of the optical components of a sixth preferred embodiment are set forth below:

| SURFACE# | R | D | GLASS |
|---|---|---|---|
| 1 | 81.0000 | 5.0000 | GERMANIUM |
| 2 ASPH | 158.1946 | D(2) | |
| 3 ASPH | −557.5081 | 2.0000 | GERMANIUM |
| 4 ASPH | 41.2942 | D(4) | |
| 5 STOP | 23.2701 | 3.0000 | GERMANIUM |
| 6 ASPH | 26.8660 | D(6) | |
| 7 | 49.0000 | 3.0000 | GERMANIUM |
| 8 ASPH | 127.0103 | D(8) | |
| 9 | 0.0000 | 1.0000 | GERMANIUM |
| 10 | 0.0000 | D(10) | |

Distance Between the Adjacent Lens Groups During the Zooming

| | WIDE-ANGLE | TELEPHOTO |
|---|---|---|
| D(2) | 12.081 | 30.974 |
| D(4) | 30.889 | 11.996 |
| D(6) | 15.605 | 16.016 |
| D(8) | 1.982 | 1.571 |
| D(10) | 17.996 | 17.996 |

Embodiment 6

Data of the optical components of a sixth preferred embodiment are set forth below:

| SURFACE# | R | D | GLASS |
|---|---|---|---|
| 1 | 81.0000 | 5.0000 | GERMANIUM |
| 2 ASPH | 158.1946 | D(2) | |
| 3 ASPH | −557.5081 | 2.0000 | GERMANIUM |
| 4 ASPH | 41.2942 | D(4) | |
| 5 STOP | 23.2701 | 3.0000 | GERMANIUM |
| 6 ASPH | 26.8660 | D(6) | |
| 7 | 49.0000 | 3.0000 | GERMANIUM |
| 8 ASPH | 127.0103 | D(8) | |
| 9 | 0.0000 | 1.0000 | GERMANIUM |
| 10 | 0.0000 | D(10) | |

Data on the Aspherical Surfaces

| SURFACE# | 0(EP) | 2(A) | 4(B) | 6(C) | 8(D) | 10(E) |
|---|---|---|---|---|---|---|
| 2 | −3.2575 | 0.00000E+000 | 1.82507E−007 | 9.31970E−012 | 0.00000E+000 | 0.00000E+000 |
| 3 | 100.9996 | 0.00000E+000 | −5.72079E−005 | 3.30036E−007 | 0.00000E+000 | 0.00000E+000 |
| 4 | 9.7130 | 0.00000E+000 | −8.24073E−005 | 3.02849E−007 | 0.00000E+000 | 0.00000E+000 |
| 5 | −3.5518 | 0.00000E+000 | 3.99116E−005 | −3.12325E−007 | 0.00000E+000 | 0.00000E+000 |
| 6 | 3.4914 | 0.00000E+000 | −1.85825E−005 | −4.18752E−007 | 0.00000E+000 | 0.00000E+000 |
| 8 | 81.1133 | 0.00000E+000 | 1.10403E−006 | −3.22377E−009 | 0.00000E+000 | 0.00000E+000 |

| Data on the Aspherical Surfaces | | | | | |
|---|---|---|---|---|---|
| SURFACE# | 0(EP) | 2(A) | 4(B) | 6(C) | 8(D) | 10(E) |
| 2 | −3.2575 | 0.00000E+000 | 1.82507E−007 | 9.31970E−012 | 0.00000E+000 | 0.00000E+000 |
| 3 | 100.9996 | 0.00000E+000 | −5.72079E−005 | 3.30036E−007 | 0.00000E+000 | 0.00000E+000 |
| 4 | 9.7130 | 0.00000E+000 | −8.24073E−005 | 3.02849E−007 | 0.00000E+000 | 0.00000E+000 |
| 5 | −3.5518 | 0.00000E+000 | 3.99116E−005 | −3.12325E−007 | 0.00000E+000 | 0.00000E+000 |
| 6 | 3.4914 | 0.00000E+000 | −1.85825E−005 | −4.18752E−007 | 0.00000E+000 | 0.00000E+000 |
| 8 | 81.1133 | 0.00000E+000 | 1.10403E−006 | −3.22377E−009 | 0.00000E+000 | 0.00000E+000 |

| Focal Length | |
|---|---|
| WIDE-ANGLE | TELEPHOTO |
| 14.03 | 55.98 |

Distance Between the Adjacent Lens Groups During the Zooming

| | WIDE-ANGLE | TELEPHOTO |
|---|---|---|
| D(2) | 12.081 | 30.974 |
| D(4) | 30.889 | 11.996 |
| D(6) | 15.605 | 16.016 |
| D(8) | 1.982 | 1.571 |
| D(10) | 17.996 | 17.996 |

| Focal Length | |
|---|---|
| WIDE-ANGLE | TELEPHOTO |
| 14.04 | 39.96 |

Distance Between the Adjacent Lens Groups During the Zooming

| | WIDE-ANGLE | TELEPHOTO |
|---|---|---|
| D(2) | 14.025 | 27.906 |
| D(6) | 25.890 | 12.009 |
| D(8) | 16.229 | 14.603 |
| D(10) | 1.563 | 3.189 |
| D(12) | 17.995 | 17.995 |

Embodiment 7

Data of the optical components in a seventh preferred embodiment are set forth below:

| SURFACE# | R | D | GLASS |
|---|---|---|---|
| 1 | 81.0000 | 5.0000 | GERMANIUM |
| 2 ASPH | 161.1561 | D(2) | |
| 3 | −110.0000 | 1.0000 | GERMANIUM |
| 4 | 81.7103 | 1.3150 | |
| 5 | −59.6537 | 1.0000 | GERMANIUM |
| 6 | −97.6426 | D(6) | |
| 7 STOP | 40.7897 | 3.0000 | GERMANIUM |
| 8 ASPH | 63.2175 | D(8) | |
| 9 | 49.0000 | 3.0000 | GERMANIUM |
| 10 ASPH | 141.9859 | D(10) | |
| 11 | 0.0000 | 1.0000 | GERMANIUM |
| 12 | 0.0000 | D(12) | |

Embodiment 8

Data of the optical components in an eighth preferred embodiment of the infrared zoom lens are set forth below:

| SURFACE# | R | D | GLASS |
|---|---|---|---|
| 1 | 81.0000 | 5.0000 | GERMANIUM |
| 2 ASPH | 168.1718 | D(2) | |
| 3 ASPH | −120.5946 | 2.0000 | GERMANIUM |
| 4 ASPH | 61.0847 | D(4) | |
| 5 STOP | 33.6303 | 1.5000 | GERMANIUM |
| 6 | 74.7907 | 1.1002 | |
| 7 | −142.3941 | 1.5000 | GERMANIUM |
| 8 | 485.6580 | D(8) | |
| 9 | 49.0000 | 3.0000 | GERMANIUM |
| 10 ASPH | 151.2012 | D(10) | |
| 11 | 0.0000 | 1.0000 | GERMANIUM |
| 12 | 0.0000 | D(12) | |

| Data on the Aspherical Surfaces | | | | | |
|---|---|---|---|---|---|
| SURFACE# | 0(EP) | 2(A) | 4(B) | 6(C) | 8(D) | 10(E) |
| 2 | −29.6441 | 0.00000E+000 | 8.85008E−007 | −2.36900E−010 | 0.00000E+000 | 0.00000E+000 |
| 7 | −15.1838 | 0.00000E+000 | 1.09487E−005 | −2.76752E−007 | 0.00000E+000 | 0.00000E+000 |
| 8 | 8.9385 | 0.00000E+000 | −2.41080E−005 | −2.09727E−007 | 0.00000E+000 | 0.00000E+000 |
| 10 | 82.6428 | 0.00000E+000 | 1.18066E−006 | −1.06211E−008 | 0.00000E+000 | 0.00000E+000 |

Data on the Aspherical Surfaces

| SURFACE# | 0(EP) | 2(A) | 4(B) | 6(C) | 8(D) | 10(E) |
|---|---|---|---|---|---|---|
| 2 | −23.2387 | 0.00000E+000 | 6.75847E−007 | −1.45178E−010 | 0.00000E+000 | 0.00000E+000 |
| 3 | 53.3315 | 0.00000E+000 | −1.51320E−005 | 1.85392E−007 | 0.00000E+000 | 0.00000E+000 |
| 4 | 23.4166 | 0.00000E+000 | −3.63164E−005 | 1.44214E−007 | 0.00000E+000 | 0.00000E+000 |
| 10 | 101.0693 | 0.00000E+000 | 2.03354E−006 | −1.72085E−008 | 0.00000E+000 | 0.00000E+000 |

| Focal length | |
|---|---|
| WIDE-ANGLE | TELEPHOTO |
| 14.045 | 39.99 |

Distance Between the Adjacent Lens Groups During the Zooming

| | WIDE-ANGLE | TELEPHOTO |
|---|---|---|
| D(2) | 11.004 | 25.738 |
| D(4) | 29.092 | 14.358 |
| D(8) | 16.3770 | 16.265 |
| D(10) | 1.5504 | 1.662 |
| D(12) | 17.993 | 17.993 |

In the preferred embodiments of the present invention, the values of the terms in the formulae (1) to (3) are given as follows:

| | Formula (1) $f_1/f_t$ | Formula (2) $f_2/f_t$ | Formula (3) $f_3/f_w$ |
|---|---|---|---|
| Embodiment 1 | 1.25 | −0.34 | 2.90 |
| Embodiment 2 | 1.42 | −0.40 | 2.01 |
| Embodiment 3 | 1.46 | −0.51 | 3.08 |
| Embodiment 4 | 1.56 | −0.53 | 3.50 |
| Embodiment 5 | 1.25 | −0.33 | 2.77 |
| Embodiment 6 | 1.30 | −0.29 | 2.48 |
| Embodiment 7 | 1.08 | −0.31 | 2.35 |
| Embodiment 8 | 0.94 | −0.23 | 2.564 |

The invention claimed is:

1. An infrared zoom lens comprising:
   first to fourth groups of lens pieces arranged in series from a foremost position closest to an object;
   each of the lens groups having all the lens pieces made of germanium, and at least one of the lens groups consisting simply of a single lens piece and
   wherein the infrared zoom lens is adapted to meet requirements as defined in the following formula:

$$1.8 \leq f3/fw \leq 4 \tag{3}$$

where fw is a focal length of the zoom lens at a wide-angle setting, and f3 is the focal length of the third lens group.

2. The infrared zoom lens according to claim 1, wherein the first lens group is of positive power, the second lens group is of negative power, the third lens group is of positive power, and the fourth lens group is of positive power.

3. The infrared zoom lens according to claim 1, wherein the infrared zoom lens is adapted to meet requirements as defined in the following formulae:

$$0.8 \leq f1/ft \leq 1.7 \tag{1}$$

where ft is a focal length of the zoom lens at a telephoto setting, and f1 is the focal length of the first lens group.

4. The infrared zoom lens according to claim 1, wherein the infrared zoom lens is adapted to meet requirements as defined in the following formulae:

$$0.7 \leq f2/ft \leq -0.1 \tag{2}$$

where ft is a focal length of the zoom lens at a telephoto setting, and f2 is the focal length of the second lens group.

5. The infrared zoom lens according to claim 1, wherein the first and third lens groups stay still in their respective fixed positions while the second and fourth lens groups are movable so as to vary a magnification rate.

6. The infrared zoom lens according to claim 1, wherein the fourth lens group is moved for the focusing.

7. The infrared zoom lens according to claim 1, wherein the first lens group comprises a meniscus lens that has its front major surface closer to the object shaped in convex.

8. The infrared zoom lens according to claim 1, wherein a foremost lens piece closest to the object in the second lens group has its rear major surface facing to an imaging field shaped in concave.

9. The infrared zoom lens according to claim 1, wherein there are two lens pieces in the second or third lens group.

10. The infrared zoom lens according to claim 1, wherein the first lens group has its lens piece shaped to have an aspherical surface.

11. The infrared zoom lens according to claim 1, wherein the second lens group has one or more of its lens pieces shaped to have an aspherical surface.

12. The infrared zoom lens according to claim 1, wherein the third lens group has one or more of its lens pieces shaped to have an aspherical surface.

13. The infrared zoom lens according to claim 1, wherein the fourth lens group has one or more of its lens pieces shaped to have an aspherical surface.

* * * * *